US012704580B2

(12) United States Patent
Pan et al.

(10) Patent No.: US 12,704,580 B2
(45) Date of Patent: Aug. 11, 2026

(54) METHOD AND APPARATUS FOR DETERMINING POSITIONING PARAMETER, DEVICE AND STORAGE MEDIUM

(71) Applicant: PURPLE MOUNTAIN LABORATORIES, Nanjing (CN)

(72) Inventors: Mengguan Pan, Nanjing (CN); Xiaohu You, Nanjing (CN); Wangdong Qi, Nanjing (CN); Yongming Huang, Nanjing (CN); Shengheng Liu, Nanjing (CN); Xinghua Jia, Nanjing (CN); Shaolei Wang, Nanjing (CN)

(73) Assignee: PURPLE MOUNTAIN LABORATORIES, Nanjing (CN)

( * ) Notice: Subject to any disclaimer, the term of this patent is extended or adjusted under 35 U.S.C. 154(b) by 307 days.

(21) Appl. No.: 18/294,969

(22) PCT Filed: Dec. 20, 2021

(86) PCT No.: PCT/CN2021/139679
§ 371 (c)(1),
(2) Date: Feb. 2, 2024

(87) PCT Pub. No.: WO2023/010763
PCT Pub. Date: Feb. 9, 2023

(65) Prior Publication Data

US 2025/0093452 A1 Mar. 20, 2025

(30) Foreign Application Priority Data

Aug. 3, 2021 (CN) ......................... 202110883913.2

(51) Int. Cl.

| | |
|---|---|
| ***G01S 5/00*** | (2006.01) |
| ***G01S 1/14*** | (2006.01) |
| ***G01S 7/4865*** | (2020.01) |

(52) U.S. Cl.
CPC .............. *G01S 5/0036* (2013.01); *G01S 1/14* (2013.01); *G01S 7/4865* (2013.01)

(58) Field of Classification Search
CPC ........ G01S 5/0036; G01S 1/14; G01S 7/4865; G01S 5/0249; G01S 17/06
See application file for complete search history.

(56) References Cited

U.S. PATENT DOCUMENTS

| | | | |
|---|---|---|---|
| 2018/0242080 | A1 | 8/2018 | Ribeiro |
| 2020/0182995 | A1 | 6/2020 | Zeng |

FOREIGN PATENT DOCUMENTS

| | | | |
|---|---|---|---|
| CN | 103152088 | A | 6/2013 |
| CN | 103984971 | A | 8/2014 |

(Continued)

OTHER PUBLICATIONS

The first OA of CN application No. 202110883913.2 issued on Sep. 6, 2021.

(Continued)

*Primary Examiner* — Tuan H Nguyen
(74) *Attorney, Agent, or Firm* — The Sun IP Law

(57) ABSTRACT

Provided are a method and apparatus for determining a positioning parameter, a computer device and a storage medium. The method includes: determining Time of Flight (ToF) spectrum data of a positioning signal according to the positioning signal sent via multi-channels by a terminal to be positioned; correcting an ideal spatial manifold matrix according to a preset antenna array deviation function, so as to obtain a corrected spatial manifold matrix; and determining a positioning parameter of Line Of Sight (LOS) of the positioning signal according to the ToF spectrum data and the corrected spatial manifold matrix, wherein the LOS is the shortest path from the terminal to be positioned to the antenna array.

20 Claims, 9 Drawing Sheets

(56) References Cited

FOREIGN PATENT DOCUMENTS

| | | | |
|---|---|---|---|
| CN | 104798393 | A | 7/2015 |
| CN | 108761383 | A | 11/2018 |
| CN | 109085564 | A | 12/2018 |
| CN | 111435158 | A | 7/2020 |
| CN | 112469119 | A | 3/2021 |
| CN | 112601282 | A | 4/2021 |
| CN | 113329491 | A | 8/2021 |

OTHER PUBLICATIONS

Zhao Weibo, FastICA-based super resolution multipath time delay estimation algorithm. Application of Electronic Technology, Apr. 6, 2013.

The first search report of CN application No. 202110883913.2 issued on Aug. 18, 2021.

Fig. 1

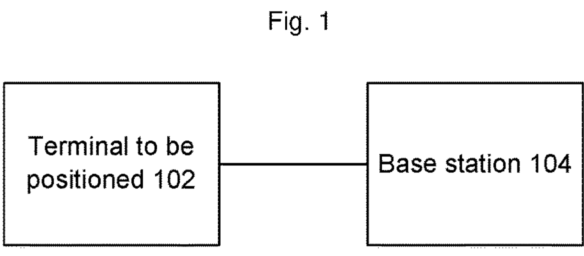

Fig. 2

ToF spectrum data of a positioning signal is determined according to the positioning signal sent via multi-channels by a terminal to be positioned — S202

An ideal spatial manifold matrix is corrected according to a preset antenna array deviation function, so as to obtain a corrected spatial manifold matrix, wherein each element in the Ideal spatial manifold matrix or the corrected spatial manifold matrix represents a response of each array element in an antenna array to the positioning signal in a preset corresponding angle range, and the antenna array deviation function represents a deviation between a response of a real antenna array to a signal and a response of an ideal antenna array to the signal — S204

A positioning parameter of LOS of the positioning signal is determined according to the ToF spectrum data and the corrected spatial manifold matrix, wherein the LOS is the shortest path from the terminal to be positioned to the antenna array — S206

Fig. 3

An amplitude measurement value set of direction-dependent amplitude responses and a phase measurement value set of phase deviations are acquired, wherein the amplitude measurement value set of direction-dependent amplitude responses is a set of direction-dependent amplitude responses that a simulated real signal arrives at each array element of the antenna array, and the phase measurement value set of phase deviations is a set of phase deviations that the simulated real signal arrives at each array element of the antenna array — S302

An amplitude pattern function is constructed according to the amplitude measurement value set, and a phase deviation function is constructed according to the phase measurement value set — S304

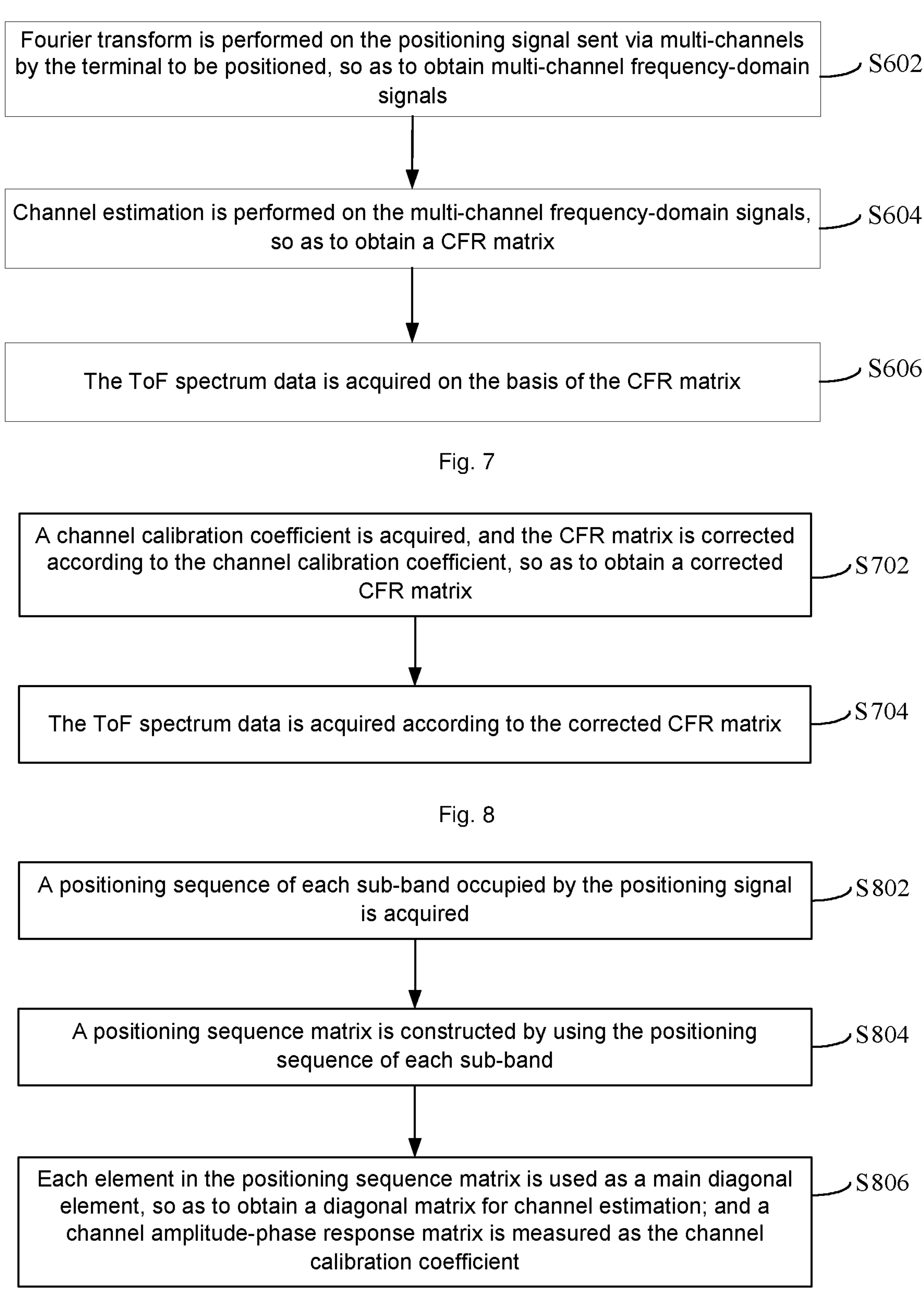
Fig. 6
Fourier transform is performed on the positioning signal sent via multi-channels by the terminal to be positioned, so as to obtain multi-channel frequency-domain signals
S602
Channel estimation is performed on the multi-channel frequency-domain signals, so as to obtain a CFR matrix
S604
The ToF spectrum data is acquired on the basis of the CFR matrix
S606
Fig. 7
A channel calibration coefficient is acquired, and the CFR matrix is corrected according to the channel calibration coefficient, so as to obtain a corrected CFR matrix
S702
The ToF spectrum data is acquired according to the corrected CFR matrix
S704
Fig. 8
A positioning sequence of each sub-band occupied by the positioning signal is acquired
S802
A positioning sequence matrix is constructed by using the positioning sequence of each sub-band
S804
Each element in the positioning sequence matrix is used as a main diagonal element, so as to obtain a diagonal matrix for channel estimation; and a channel amplitude-phase response matrix is measured as the channel calibration coefficient
S806

METHOD AND APPARATUS FOR DETERMINING POSITIONING PARAMETER, DEVICE AND STORAGE MEDIUM

CROSS-REFERENCE TO RELATED APPLICATION

This disclosure claims priority to Chinese Patent Application No. 202110883913.2 filed on Aug. 3, 2021 and entitled “Method and Apparatus for Determining Positioning Parameter, Device and Storage Medium”, the disclosure of which is hereby incorporated by reference in its entirety.

TECHNICAL FIELD

The present disclosure relates to the technical field of communications, and in particular, to a method and apparatus for determining a positioning parameter, a device and a storage medium.

BACKGROUND

With the rapid development of industrial Internet, Internet of Things, and Internet of Vehicles, high-accuracy positioning has become an indispensable key support service for mobile terminals such as intelligent robots and unmanned vehicles. A satellite navigation and positioning technology has the advantages of wide area coverage and good generalizability. However, due to low signal power and weak penetration power, the satellite navigation and positioning technology is mainly used for terminal positioning in open outdoor environments, and cannot provide a navigation and positioning service in sheltered environments and indoor environments.

In order to solve the above problems, in the related art, basic facilities of a wireless communication system or a private wireless positioning base station for deployment is used to position a terminal device. For example, positioning signals sent by the terminal device may be simultaneously measured by using a space-time super-resolution algorithm, so as to determine corresponding positioning parameters, which are Time of Flight (ToF) and Angle of Arrival (AoA), and then positioning information of the terminal device may be determined on the basis of the positioning parameters.

SUMMARY

The present disclosure provides a method and apparatus for determining a positioning parameter, and a computer device and a storage medium.

According to a first aspect, the present disclosure provides a method for determining a positioning parameter, including:

- determining Time of Flight (ToF) spectrum data of a positioning signal according to the positioning signal sent via multi-channels by a terminal to be positioned;
- correcting an ideal spatial manifold matrix according to a preset antenna array deviation function, so as to obtain a corrected spatial manifold matrix, wherein each element in the ideal spatial manifold matrix or the corrected spatial manifold matrix represents a response of a corresponding array element in an antenna array to a positioning signal in a preset corresponding angle range, and the antenna array deviation function represents a deviation between a response of a real antenna array to a signal and a response of an ideal antenna array to the signal;
- determining a positioning parameter of Line Of Sight (LOS) of the positioning signal according to the ToF spectrum data and the corrected spatial manifold matrix, wherein the LOS is a shortest path from the terminal to be positioned to the antenna array.

According to a second aspect, the present disclosure provides an apparatus for determining a positioning parameter, including:

- a first determination module, configured to determine ToF spectrum data of a positioning signal according to the positioning signal sent via multi-channels by a terminal to be positioned;
- a correction module, configured to correct an ideal spatial manifold matrix according to a preset antenna array deviation function, so as to obtain a corrected spatial manifold matrix, wherein each element in the ideal spatial manifold matrix or the spatial manifold matrix represents a response of a corresponding array element in an antenna array to a positioning signal in a preset corresponding angle range, and the antenna array deviation function represents a deviation between a response of a real antenna array to a signal and a response of an ideal antenna array to the signal;
- a second determination module, configured to determine a positioning parameter of LOS of the positioning signal according to the ToF spectrum data and the corrected spatial manifold matrix, wherein the LOS is a shortest path from the terminal to be positioned to the antenna array.

According to a third aspect, the present disclosure provides a computer device, which includes a memory and a processor, wherein the memory stores a computer program, the processor implements, when executing the computer program, steps of the method in any one of the above embodiments in the first aspect.

According to a fourth aspect, the present disclosure provides a computer-readable storage medium, wherein the computer-readable storage medium stores a computer program, steps of the method in any one of the above embodiments in the first aspect are implemented when the computer program is executed by a processor.

The details of one or more embodiments of the present disclosure are set forth in the drawings and the description below. Other features, objectives, and advantages of the present disclosure will be apparent from the drawings and the claims from the specification.

BRIEF DESCRIPTION OF THE DRAWINGS

FIG. 1 is an application environment diagram of a method for determining a positioning parameter according to an embodiment.

FIG. 2 is a schematic flowchart of a method for determining a positioning parameter according to an embodiment.

FIG. 3 is a schematic flowchart of a method for determining a positioning parameter according to another embodiment.

FIG. 6 is a schematic flowchart of a method for determining a positioning parameter according to another embodiment.

FIG. 7 is a schematic flowchart of a method for determining a positioning parameter according to another embodiment.

FIG. 8 is a schematic flowchart of a method for determining a positioning parameter according to another embodiment.

DETAILED DESCRIPTION OF THE EMBODIMENTS

Figure 4:
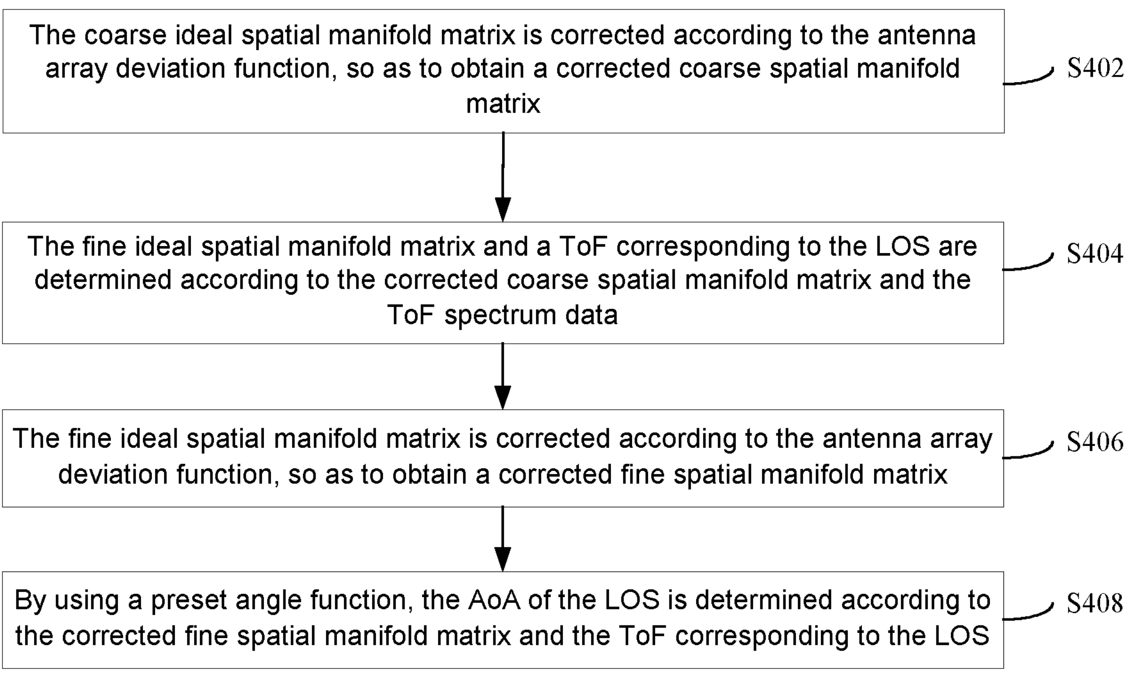
FIG. 4 is a schematic flowchart of a method for determining a positioning parameter according to another embodiment.

To make the objectives, technical solutions and advantages of the present disclosure clearer, the present disclosure is further described in detail below with reference to the drawings and embodiments. It should be understood that the specific embodiments described here are merely used to explain the present disclosure, and are not used to limit the present disclosure.

With the rapid development of industrial Internet, Internet of Things, and Internet of Vehicles, high-accuracy positioning has become an indispensable key support service for mobile terminals such as intelligent robots and unmanned vehicles. A satellite navigation and positioning technology has the advantages of wide area coverage and good generalizability. However, due to low signal power and weak penetration power, the satellite navigation and positioning technology is mainly used for terminal positioning in open outdoor environments, and cannot provide a navigation and positioning service in sheltered environments and indoor environments.

In order to solve the above problems, one main technical approach is to use basic facilities of a wireless communication system or a private wireless positioning base station for deployment to position a terminal device. Typical positioning technologies include cellular network positioning, Wireless Local Area Network (WLAN) positioning, Bluetooth positioning, Ultra-Wide Band (UWB) positioning, and the like. Systems such as a cellular mobile network, a WLAN, and a UWB generally use a broadband transmission signal and an array antenna, which can simultaneously measure ToF and AoA. In an actual system, due to the impact of processing technic, tooling, and mutual coupling between array elements, there are differences between in-array radiation patterns of array elements in an array. In this case, there are differences in amplitude and phase responses of incident signals from different angles, and the differences are significant at a large AoA. However, existing studies are less informative about the estimation performance of a positioning base station at a large AoA. In addition, in a complex path environment, a real-time positioning requirement for a fast-moving target requires that a positioning algorithm can take both estimation accuracy and real-time performance into consideration.

Based on this, the present disclosure provides a method for determining a positioning parameter, which can take both the accuracy and real-time performance of measuring ToF and AoA into consideration, thereby improving the accuracy of the positioning parameter. The method for determining the positioning parameter provided in the present disclosure is applicable to an application environment shown in FIG. 1. A terminal 102 to be positioned communicates with a base station 104 via a network. The terminal to be positioned may send a positioning signal to the base station; and the base station receives the positioning signal by means of an antenna array, and calculates and corrects the positioning signal in real time, so as to determine the positioning parameter of the positioning signal. The terminal 102 to be positioned may include a mobile terminal device such as a vehicle and an airplane. The base station 104 may include a macro base station and a distributed base station, and is not limited herein.

In an embodiment, as shown in FIG. 2, a method for determining a positioning parameter is provided. For example, the method is applied to the base station in FIG. 1, and includes the following steps.

At S202, ToF spectrum data of a positioning signal is determined according to the positioning signal sent via multi-channels by a terminal to be positioned.

The terminal to be positioned may include a mobile terminal device such as a vehicle and an airplane. The positioning signal is a signal including a positioning sequence, may be a 5G signal, a 4G signal, and the like, and is not limited herein. The ToF is a propagation delay, which is the flying time that the signal is propagated from a transmitter end to a receiver end, thus also being called ToF.

For example, when the terminal to be positioned sends the positioning signal to the base station, the base station may receive the positioning signal by means of an antenna array, and perform super-resolution ToF spectrum estimation on the positioning signal after receiving the positioning signal, so as to obtain the ToF spectrum data. The antenna array may be a linear array, or may be a circular array, and is not limited herein. In addition, the antenna array may include a plurality of array elements, and each array element may correspond to one receiving channel.

Further, when the super-resolution ToF spectrum estimation is performed on each receiving channel, a fading coefficient on a delay region of interest is estimated by means of scanning. The process is also called delay spectrum estimation or ToF spectrum estimation. Scan delays corresponding to ToF spectrum peak points represent signal components corresponding to a plurality of paths that the positioning signal is reflected by an obstacle or directly arrives at the antenna array; and a ToF value corresponding to the corresponding ToF spectrum peak point is the ToF of the corresponding path.

Solution may be performed on the ToF spectrum data by means of a single point Least Square (LS) algorithm, an Amplitude and Phase Estimation (APES) algorithm, an Iterative Adaptive Approach (IAA), and a sparse reconstruction algorithm and so on, so as to determine the ToF of the positioning signal.

At S204, an ideal spatial manifold matrix is corrected according to a preset antenna array deviation function, so as to obtain a corrected spatial manifold matrix, wherein each element in the ideal spatial manifold matrix or the spatial manifold matrix represents a response of a corresponding array element in an antenna array to a positioning signal in a preset corresponding angle range, and the antenna array deviation function represents a deviation between a response of a real antenna array to a signal and a response of an ideal antenna array to the signal.

The preset corresponding angle range is an angle range of each portion after an antenna array coverage range $[\theta_{min}, \theta_{max}]$ is divided into Q portions. The antenna array coverage range $[\theta_{min}, \theta_{max}]$ may be divided with an equal AoA interval $\delta\theta$. An antenna array deviation function may be a function of an antenna phase deviation and an amplitude deviation and is obtained in advance through offline measurement. The antenna array deviation function is the deviation between the response of a real antenna array to a signal and the response of an ideal antenna array to the signal.

As at least one alternative embodiment, an ideal spatial manifold matrix is a perfect spatial manifold matrix, but during actual application of the antenna array, due to factors such as antenna planning and mutual coupling between array elements, the antenna array is not in a perfect situation, such that there is an AOA-dependent phase deviation in the antenna array. If an ideal spatial manifold matrix is used to perform direction-finding processing, a large direction-finding deviation occurs due to mismatch between the ideal manifold and the actual manifold. The ideal spatial manifold matrix is corrected by means of the preset antenna array deviation function, and results that are more in line with reality are obtained.

At S206, a positioning parameter of LOS of the positioning signal is determined according to the ToF spectrum data and the corrected spatial manifold matrix, wherein the LOS is the shortest path from the terminal to be positioned to the antenna array.

For example, AoA spectrum estimation may be performed on the ToF spectrum data of the Nth receiving channel on each delay grid point by using a Digital Beam Forming (DBF) method and a MUltiple Signal Classification (MUSIC) algorithm and so on, so as to obtain a ToF-AoA two-dimensional spectrum estimation; and spectrum peak extraction is performed on the obtained ToF-AoA two-dimensional spectrum estimation, so as to obtain estimated values of fading coefficients, AoA, and ToF corresponding to maximum $K_1$ spectrum peaks, which are respectively recorded as $\hat{\gamma}_k$, $\hat{\theta}_k$, $\hat{\tau}_k$, k=1, . . . , $K_1$. A LOS component is extracted according to the fading coefficients $\hat{\gamma}_k$ and ToF values $\hat{\tau}_k$ corresponding to the $K_1$ spectrum peak components, that is, from the fading coefficient $\hat{\gamma}_k$ and the ToF value $\hat{\tau}_k$ corresponding to each path, and ToF estimation results and AoA estimation results of the LOS component are outputted. Alternatively, after the AoA estimation result is acquired, fine delay grid points may be then divided, and the idea spatial manifold matrix is corrected; and then fine searching is performed on the corrected spatial manifold matrix, so as to determine a fine AoA result, and there are no limitations herein. Since there are some obstacles in an actual environment, a signal arrives at the antenna array after being reflected and refracted, such that there are a plurality of paths that the signal arrives from a transmitter to the antenna array. The LOS is the shortest path from the terminal to be positioned to the antenna array, which may also be understood as the path that the positioning signal directly arrives at the antenna array without refraction or reflection.

In the method for determining the positioning parameter, the ToF spectrum data of the positioning signal is determined according to the positioning signal sent via multi-channels by the terminal to be positioned; the ideal spatial manifold matrix is corrected according to the preset antenna array deviation function, so as to obtain the corrected spatial manifold matrix; and the positioning parameter of LOS of the positioning signal is determined according to the ToF spectrum data and the corrected spatial manifold matrix. The ideal spatial manifold matrix can be corrected by using the preset antenna array deviation function including a phase and an amplitude, so as to reduce the deviation between the response of a real antenna array to a signal and the response of an ideal antenna array to the signal, and the LOS, which is the shortest path from the terminal to be positioned to the antenna array, is determined, such that the accuracy of measuring the positioning parameter of the positioning signal is improved. In addition, the solution avoids the problem of high computational complexity caused by simultaneous measurement of the ToF and the AoA in the related art.

In the above embodiment, the method for determining the positioning parameter is described, and is mainly to correct, according to the antenna array deviation function, the spatial manifold matrix reflecting the response of receiving the positioning signal by the antenna array. Now, the way of constructing the antenna array deviation function is described by using an embodiment. In an embodiment, as shown in FIG. 3, a process of constructing the antenna array deviation function includes the following steps.

At S302, an amplitude measurement value set of direction-dependent amplitude responses and a phase measurement value set of phase deviations are acquired, wherein the amplitude measurement value set of direction-dependent amplitude responses is a set of direction-dependent amplitude responses that a simulated real signal arrives at each array element of the antenna array, and the phase measurement value set of phase deviations is a set of direction-dependent amplitude responses that the simulated real signal arrives at each array element of the antenna array.

The simulated real signal is a signal that is transmitted by a signal generator in an anechoic chamber simulating the real signal.

For example, the antenna array is placed on a rotary table in the anechoic chamber, and may be rotated −60° to 60°. Every 5° of rotation is set as a sampling angle. The sampling angles form a discrete AoA set $$\{\ddot{\theta}_r\}_{r=1}^{R}.$$

On arriving each sampling angle, amplitude measurement values of direction-dependent amplitude responses that the simulated real signal arrives at each array element of the antenna array are acquired, and all acquired amplitude measurement values form the amplitude measurement value set; and phase measurement values of phase deviations that the simulated real signal arrives at each array element of the antenna array are acquired, and all acquired phase measurement values form the phase measurement value set. On the discrete AoA set $$\{\overline{\theta}_r\}_{r=1}^{R},$$

measurement sets of the amplitude pattern and phase deviation of each array element n of an antenna are shown as $$\{\overline{\rho}_{n,r}\}_{r=1}^{R},\ \{\overline{\phi}_{n,r}\}_{r=1}^{R},\ n=1,\ \dots\ ,N,$$

At S304, an amplitude pattern function is constructed according to the amplitude measurement value set, and a phase deviation function is constructed according to the phase measurement value set.

As at least one alternative embodiment, according to the measurement sets of the amplitude pattern and phase deviation of each array element n of the antenna, functions $\rho_n(\theta)$ and $\phi_n(\theta)$ may be estimated by means of polynomial fitting, a support vector machine, or a neural network. For example, the function $\phi_n(\theta)$ is estimated by using the polynomial fitting method, and the process is described as below. An obtained function fitting result is recorded as $\hat{\phi}_{poly,n}(\theta,g)$ where $g\in R^{J\times 1}$ is a polynomial weight, J is a polynomial fitting order, the form of $\hat{\phi}_{poly,n}(\theta,g)$ is $$\hat{\phi}_{poly,n}(\theta,g)=\Sigma_{l=1}^{J}g_l\theta^{l-1},$$

and $g_l$ is a $l^{th}$ element of a weight vector g. An objective function for polynomial fitting is shown as $$\min_{g}\sum\nolimits_{r=1}^{R}\left|\hat{\phi}_{poly,n}(\overline{\theta}_r,g)-\overline{\phi}_{n,r}\right|^2.$$

The objective function is solved to obtain the weight g, and then $\hat{\phi}_n(\theta)=\hat{\phi}_{poly,n}(\theta,g)$, such that the phase deviation function $\hat{\phi}_n(\theta)$ may be obtained. The function $\hat{\rho}_n(\theta)$ is estimated by using the polynomial fitting method, and the process is described as below. An obtain function fitting result is recorded $\hat{\rho}_{poly,n}(\theta,g)$, where $g\in R^{J\times 1}$ is a polynomial weight, J is a polynomial fitting order, the form of $\hat{\rho}_{poly,n}(\theta,g)$ is $$\hat{\rho}_{poly,n}(\theta,g)=\Sigma_{l=1}^{J}g_l\theta^{l-1},$$

and $g_l$ is a $l^{th}$ element of a weight vector g. An objective function for polynomial fitting is shown as $$\min_{g}\sum\nolimits_{r=1}^{R}\left|\hat{\rho}_{poly,n}(\theta,g)-\overline{\rho}_{n,r}\right|^2.$$

The objective function is solved to obtain the weight g, and then $\hat{\rho}_n(\theta)=\hat{\rho}_{poly,n}(\theta,g)$, such that the phase deviation function $\rho_{poly,n}(\theta,g)$ may be obtained.

In this embodiment, the amplitude measurement value set of direction-dependent amplitude responses that the simulated real signal arrives at each array element of the antenna array, and the phase measurement value set of phase deviations that the simulated real signal arrives at each array element of the antenna array are acquired; and the amplitude pattern function is constructed according to the amplitude measurement value set, and the phase deviation function is constructed according to the phase measurement value set. In this way, the spatial manifold matrix reflecting the response to receiving the positioning signal by the antenna array can be corrected, such that the accuracy of measuring the positioning parameter of the positioning signal is improved.

In the above embodiment, the way of constructing the antenna deviation function is described. For example, the spatial manifold matrix is corrected by using the antenna deviation function with an embodiment. In and embodiment, the ideal spatial manifold matrix includes a coarse ideal spatial manifold matrix and a fine ideal spatial manifold matrix; each element in the coarse ideal spatial manifold matrix represents a response of each array element in the antenna array to the positioning signal in a first preset corresponding angle range; each element in the fine ideal spatial manifold matrix represents a response of each array element in the antenna array to the positioning signal in a second preset corresponding angle range; and the first preset corresponding angle range is greater than the second preset corresponding angle range.

The preset corresponding angle range is the corresponding AoA set $$\{\theta_q\}_{q=1}^{Q}$$

that is obtained by dividing the antenna array coverage range $[\theta_{min}, \theta_{max}]$ to Q portions with the equal AoA interval $\delta\theta$. A coarse result AoA region $$\left[\hat{\theta}_{LOS}-\Delta\theta,\ \hat{\theta}_{LOS}+\Delta\theta\right]:$$

may be divided by using a uniform grid $\delta\theta_1$, so as to obtain $Q_1$ fine search grid sets, which are recorded as $$\{\psi_q\}_{q=1}^{Q_1},$$

wherein the coarse result AoA region $$\left[\hat{\theta}_{LOS}-\Delta\theta,\ \hat{\theta}_{LOS}+\Delta\theta\right]$$

is obtained by calculating the corrected coarse ideal spatial manifold matrix, $\Delta\theta$ may be determined according to the size of a coarse search grid, for example, may be selected as $\Delta\theta=\delta\theta$, and $\delta\theta_1$ may be selected to be about 1/10 of $\Delta\theta$.

For example, the ideal spatial manifold matrix includes a coarse ideal spatial manifold matrix and a fine ideal spatial manifold matrix; each element in the coarse ideal spatial manifold matrix represents a response of each array element in the antenna array to the positioning signal in a first preset corresponding angle range; each element in the fine ideal spatial manifold matrix represents a response of each array element in the antenna array to the positioning signal in a second preset corresponding angle range; and the first preset corresponding angle range is greater than the second preset corresponding angle range.

At AoA θ, an ideal array steering vector $a_\theta(\theta)$ is determined by an array structure, and a set of array steering vectors on an AoA set $$\{\theta_q\}_{q=1}^{Q}$$

form an ideal manifold matrix of the array, which is recorded as $A_\theta$, where $$A_\theta = [a_\theta(\theta_1), a_\theta(\theta_2), \ldots , a_\theta(\theta_Q)].$$

The ideal manifold matrix $A_{\theta,fine}$ corresponding to a fine search AoA set is determined, where $$A_{\theta,fine} = \left[a_\theta(\psi_1), a_\theta(\psi_2), \ldots , a_\theta(\psi_{Q_1})\right].$$

In this embodiment, the ideal spatial manifold matrix includes the coarse ideal spatial manifold matrix and the fine ideal spatial manifold matrix; each element in the coarse ideal spatial manifold matrix represents the response of each array element in the antenna array to the positioning signal in the first preset corresponding angle range; and each element in the fine ideal spatial manifold matrix represents the response of each array element in the antenna array to the positioning signal in the second preset corresponding angle range. Since the first preset corresponding angle range is greater than the second preset corresponding angle range, division of different coarseness grid points and correction may be performed on the ideal spatial manifold matrix, so as to guarantee the accuracy of the obtained result to be higher.

In the above embodiment, two ideal coarseness forms of the ideal spatial manifold matrix are introduced. Now, the way of determining the positioning parameter of the LOS of the positioning signal by using the ideal spatial manifold matrix in the two ideal coarseness forms is described with an embodiment. In an embodiment, as shown in FIG. 4, the positioning parameters include the AoA and the ToF. The step of determining the positioning parameter of the LOS of the positioning signal according to the ToF spectrum data and the corrected spatial manifold matrix includes the following steps.

At S402, the coarse ideal spatial manifold matrix is corrected according to the antenna array deviation function, so as to obtain a corrected coarse spatial manifold matrix.

For example, the antenna array deviation function is determined according to the amplitude pattern function and the phase deviation function; the antenna array deviation function may be represented as $$\hat{\zeta}(\theta_q): \hat{\zeta}(\theta_q)\,|_n = \hat{\rho}_n(\theta_q)\cdot \exp\left(j\hat{\psi}_n(\theta_q)\right);$$

and the antenna phase deviation function $\hat{\phi}_n(\theta)$ and the amplitude pattern function $\hat{\rho}_n(\theta)$, n=1, . . . , N are functions obtained in advance through offline measurement. According to an equation $$A'_\theta|_{(n,q)} = \frac{A_\theta|_{(n,q)}}{\hat{\zeta}(\theta_q)\big|_n},\ n = 1, \ldots , N,\ q = 1, \ldots , Q,$$

the coarse ideal spatial manifold matrix $A_\theta$ may be corrected, so as to obtain the corrected coarse spatial manifold matrix $A_\theta'$.

At S404, the fine ideal spatial manifold matrix and ToF corresponding to the LOS are determined according to the corrected coarse spatial manifold matrix and the ToF spectrum data.

The ToF spectrum data may include vectors $$\beta_n = [\beta_{n,1}, \beta_{n,2}, \ldots , \beta_{n,P}]^T$$

that are formed by delay $\tau_p$, p=1, . . . , P corresponding to each scanning grid point, where $\beta_{n,p}$ is a fading coefficient on each scanning grid point, and n is an $n^{th}$ receiving array element in the antenna array, which is the $n^{th}$ receiving channel.

As at least one alternative embodiment, a delay range $[\tau_{min}, \tau_{max}]$ of interest is divided into P portions at equal intervals, generally P>>K (the number of paths), and the delays corresponding to P scanning grid points may respectively be $\tau_p$, p=1, . . . , P. $\beta_{n,p}$ is recorded, where p=1, . . . , P, $\beta_{n,p}$ is the fading coefficient on each scanning grid point. When $$\tau_p = \tilde{\tau}_k,\ \beta_{n,p} = \alpha_{n,k}\tilde{\gamma}_k,\ \alpha_{n,k},\ \text{where } \alpha_{n,k}$$

represents the response of the $n^{th}$ receiving array element to an incident signal of a $k^{th}$ path, and $\hat{\gamma}_k$ is a fading coefficient of the $k^{th}$ path. On other P-K grid points, $\beta_{n,p}=0$.

$$\beta_n = [\beta_{n,1}, \beta_{n,2}, \ldots , \beta_{n,P}]^T$$

is recorded as a fading coefficient vector on the scanning grid point set, and $$A_\tau = [a_\tau(\tau_1), \ldots , a_\tau(\tau_P)]$$

is a delay matching matrix on the scanning grid point set. Then $$h_n \approx A_\tau\beta_n + w_n,\ n = 1, \ldots , N,$$

wherein $h_n$ is an $n^{th}$-column element in a Channel Frequency Response (CFR) matrix that is formed after channel estimation is performed on the received positioning signal, representing the CFR of the $n^{th}$ receiving channel.

As at least one alternative embodiment, for ToF spectrum estimation of the $n^{th}$ channel, an objective function which is solved by the IAA, is $$\underset{\beta_{n,p}}{\text{argmin}}\|h_n - \beta_{n,p}a_\tau(\tau_p)\|^2_{R^{-1}_{n,p}},\ p = 1, 2, \ldots, P,$$

then the fading coefficient of each receiving channel on each scanning grid point is obtained, and $$\beta_n = [\beta_{n,1}, \beta_{n,2}, \ldots, \beta_{n,P}]^T$$

is formed, that is, the ToF spectrum data; and $$\|x\|^2_Q = x^H Qx$$

represents a weighted $l_2$ norm of a vector x. $R_{n,p}$ represents an interference covariance matrix of the $n^{th}$ receiving channel at the $p^{th}$ scanning grid point, and the interference is formed by the signal components other than the current grid point $\tau_p$.

An objective function for spectrum solution using a $\ell_1$ based sparse reconstruction algorithm is $$\min_{\beta_{n,p}}\left\|h_n - \sum_{p=1}^{P}\beta_{n,p}a_\tau(\tau_p)\right\|^2,\ \text{s.t.}\ \|\beta_n\|_1 \le \eta,$$

then the fading coefficient of each receiving channel on each scanning grid point is obtained, and $\beta_n=[\beta_{n,1},\beta_{n,2}, \ldots, \beta_{n,P}]^T$ is formed, that is, the ToF spectrum data; and $\|X\|_1$ represents a weighted $\ell_1$ norm of the P-dimensional vector X, which is defined as $$\|x\|_1 = \sum_{p=1}^{P}|x_p|.$$

For example, a $p^{th}$ delay unit may be set, ToF spectrum data vectors of N receiving channels are $$b_p \in C^{N\times 1},\ \text{where}\ b_p = \left[\hat\beta_{1,p}, \hat\beta_{2,p}, \ldots, \hat\beta_{N,p}\right]^T;$$

and AoA spectrum estimation is successively performed on the ToF spectrum data vectors $$b_p \in C^{N\times 1},\ p = 1, \ldots, P,$$

and an AoA spectrum estimation result on a $p^{th}$ ToF unit is recorded as $$\hat\gamma_p,\ p = 1, \ldots, P,\ \hat\gamma_p \in C^{Q\times 1}.$$

A spectrum estimation method may be a Digital Beam Forming (DBF) method, a MUltiple Signal Classification (MUSIC) algorithm, etc. By using the DBF algorithm as an example, the spectrum estimation result is $$\hat\gamma_p = \frac{A'^H_\theta b_p}{N},\ p = 1, \ldots, P;\ \hat\Gamma = [\hat\gamma_1, \ldots, \hat\gamma_p]$$

is recorded as a ToF-AoA two-dimensional spectrum estimation result; and an element $\hat\Gamma_{q,p}$ at a $q^{th}$ row and a $p^{th}$ column represents an estimated value of a channel fading coefficient at ToF $\tau_p$ and AoA $\theta_q$.

Figure 5:
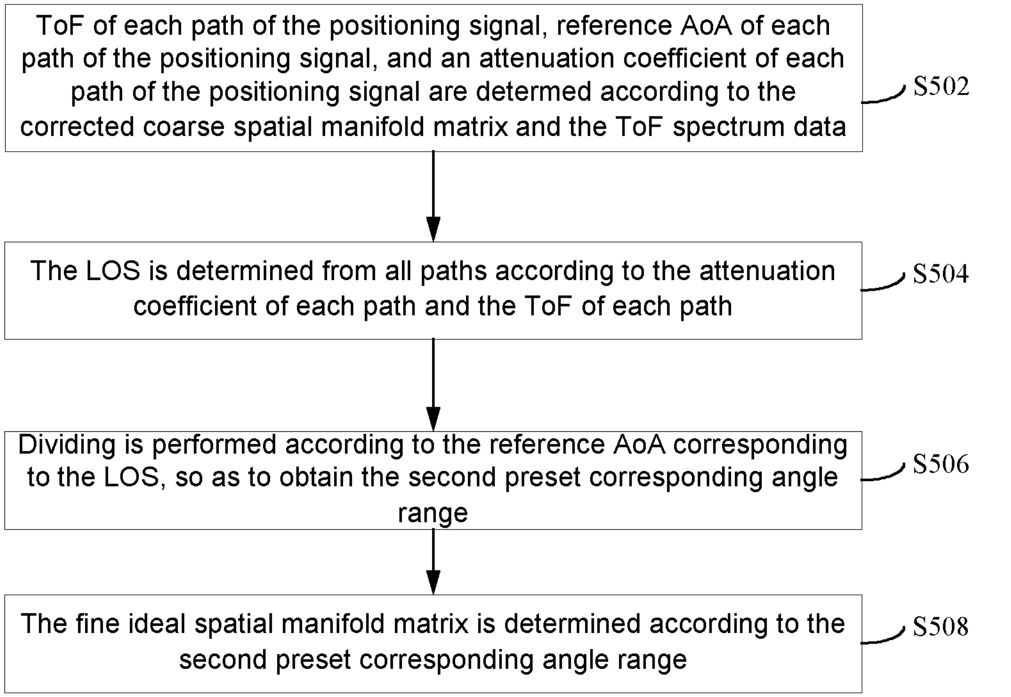
FIG. 5 is a schematic flowchart of a method for determining a positioning parameter according to another embodiment.

Further, as shown in FIG. 5, the step of determining the fine ideal spatial manifold matrix according to the corrected coarse spatial manifold matrix and the ToF spectrum data includes the following steps.

At S502, ToF of each path of the positioning signal, reference AoA of each path, and an attenuation coefficient of each path are determined according to the corrected coarse spatial manifold matrix and the ToF spectrum data.

As at least one alternative embodiment, two-dimensional positioning parameter spectrum data of the N receiving channels are determined by using an formula $$\hat\gamma_p = \frac{A'^H_\theta b_p}{N},\ p = 1, \ldots, P$$

according to the corrected coarse spatial manifold matrix $$A'_\theta$$

and the ToF spectrum data $\hat\Gamma=[\hat\gamma_1, \ldots, \hat\gamma_P]$. Spectrum peak extraction is performed according to the two-dimensional positioning parameter spectrum data, so as to obtain the ToF of each path of the positioning signal, the reference AoA of each path of the positioning signal, and the attenuation coefficient of each path of each path of the positioning signal. For example, the method includes: traversing each point in a two-dimensional spectrum; comparing the two-dimensional spectrum intensity of the point relative to the two-dimensional spectrum intensity of 8 neighboring points; if the two-dimensional spectrum intensity of the point is greater than the two-dimensional spectrum intensity of all its 8 neighboring points, determining the point as a spectrum peak point; finding all spectrum peak points of the two-dimensional spectrum, then performing sorting according to the spectrum peak intensity, and extracting maximum $K_1$ spectrum peaks; and according to the $K_1$ spectrum peaks, determining corresponding AoA $\hat\theta_k$ and ToF $\hat\tau_k$ according to the horizontal and vertical coordinates of the spectrum peaks, and determining the fading coefficient $\hat\gamma_k$ according to the spectrum peak intensity respectively.

At S504, the LOS is determined from paths according to the attenuation coefficient of each path and the ToF of each path.

As at least one alternative embodiment, by means of a preset spectrum peak intensity threshold $\lambda$, $K_2$ components of which energy exceeds the preset spectrum peak intensity threshold $\lambda$ may be extracted from the $K_1$ spectrum peak components, and then a component with the corresponding ToF being the minimum is extracted from the $K_2$ components as an LOS component, that is, the component corresponding to the LOS. That is, in the spectrum peak components exceeding the preset spectrum peak intensity threshold in the attenuation coefficient of each path, the component with the minimum ToF may be directly determined, according to the solved ToF of the paths, as the ToF corresponding to the LOS.

As at least one alternative embodiment, the LOS component may also be extracted on the basis of basic standards that the LOS is shorter than reflection path propagation time, the LOS is stronger than reflection path energy or the ToF estimation variance and AoA estimation variance of the LOS components between the plurality of frames are smaller.

At S506, dividing is performed according to the reference AoA corresponding to the LOS, so as to obtain the second preset corresponding angle range.

As at least one alternative embodiment, $Q_1$ fine search grid sets, which are recorded as $$\{\psi_q\}_{q=1}^{Q_1},$$

are obtained by dividing an AoA region $$[\hat{\theta}_{LOS}-\Delta\theta, \hat{\theta}_{LOS}+\Delta\theta]:$$

using a uniform grid $\delta\theta$, where $\Delta\theta$ may be determined according to the size of a coarse search grid, for example, may be selected as $\Delta\theta=\delta\theta$, and $\delta\theta_1$ may be selected to be about 1/10 of $\Delta\theta$.

At S508, the fine ideal spatial manifold matrix is determined according to the second preset corresponding angle range.

As at least one alternative embodiment, the fine search AoA sets may be substituted into a preset ideal manifold matrix, so as to determine the corresponding ideal manifold matrix $A_{\theta,fine}$, where $$A_{\theta,fine}=[a_\theta(\psi_1), a_\theta(\psi_2), \ldots, a_\theta(\psi_{Q_1})].$$

At S406, the fine ideal spatial manifold matrix is corrected according to the antenna array deviation function, so as to obtain a corrected fine spatial manifold matrix.

As at least one alternative embodiment, a function value, which is the antenna array deviation function $$\hat{\zeta}(\psi_q)|_n=\hat{\rho}_n(\psi_q)\cdot\exp(j\hat{\phi}_n(\psi_q)),\ q=1, \ldots, Q_1,\ n=1, \ldots, N,$$

of the antenna array deviation function on the fine search grid point is calculated according to the estimated values $$\hat{\phi}_n(\theta), \hat{\rho}_n(\theta), n=1, \ldots, N$$

of the antenna phase deviation function and the amplitude pattern function. Then the corrected manifold matrix is $$A'_{\theta,fine},$$

and an element at the $n^{th}$ row and $q^{th}$ column of $$A'_{\theta,fine}$$

is $$A'_{\theta,fine}|_{(n,q)}=\frac{A_{\theta,fine}|_{(n,q)}}{\hat{\zeta}(\psi_q)|_n},\ n=1, \ldots, N,\ q=1, \ldots, Q_1.$$

At S408, by using a preset angle function, AoA of the LOS is determined according to the corrected fine spatial manifold matrix and the ToF corresponding to the LOS.

As at least one alternative embodiment, $b_{LOS}$ is recorded as the ToF spectrum data of the N receiving channels on a ToF unit where the LOS component is located. The AoA fine estimation is performed on the basis of a beam scanning peak criterion by substituting the corrected fine spatial manifold matrix and the ToF corresponding to the LOS into an angle function corresponding to the beam scanning peak criterion or an angle function corresponding to a criterion such as subspace orthogonality. For example, $b_{LOS}$ and $$A'_{\theta,fine}$$

are substituted into the angle function $$\arg_\theta\max {A'_{\theta,fine}}^H b_{LOS}$$

of the beam scanning peak criterion, so as to determine $\theta$, which is the AoA of the LOS. In addition, $b_{LOS}$ and $$A'_{\theta,fine}$$

may also be substituted into the angle function $$\arg_\theta\max\left\|{A'_{\theta,fine}}^H\hat{U}_N\right\|_F,$$

on the basis of the subspace orthogonality criterion, so as to determine a final $\theta$ value, which is the AoA of the LOS; $\|X\|_F$ represents a Frobenius norm of a matrix X, and is defined as $$\|X\|_F=\sqrt{tr(X^HX)}.$$

$\hat{U}_N$ is an estimation result of a noise subspace obtained according to the vector $b_{LOS}$.

In this embodiment, the coarse ideal spatial manifold matrix is corrected according to the antenna array deviation function, so as to obtain the corrected coarse spatial manifold matrix; the fine ideal spatial manifold matrix and the ToF corresponding to the LOS are determined according to the corrected coarse spatial manifold matrix and the ToF spectrum data; the fine ideal spatial manifold matrix is corrected according to the antenna array deviation function, so as to obtain the corrected fine spatial manifold matrix; and by using the preset angle function, the AoA of the LOS is determined according to the corrected fine spatial manifold matrix and the ToF corresponding to the LOS. In this way, an antenna error related to the AoA can be effectively compensated by means of correcting the ideal manifold matrix. Calculation complexity when the ToF and the AoA are simultaneously searched by using two dimensions in the related art is reduced by means of delay spectrum estimation and a multistage cascade signal processing mode of first performing coarse grained searching then fine searching on the AoA of the LOS, such that positioning real-time performance is improved. In addition, a phase error related to the AoA can be accurately compensated, so as to improve direction-finding and positioning accuracy, and in particular, the direction-finding accuracy can be significantly improved when a wireless signal at large AoA.

In the above embodiment, the way of determining the positioning parameter of the LOS of the positioning signal by using the ideal spatial manifold matrix in the two ideal coarseness forms is described. Before the positioning parameter of the LOS of the positioning signal is determined, relevant processing needs to be first performed on the received positioning signal, and then the ToF spectrum data of the positioning signal is determined. Now, the above is described with an embodiment. As shown in FIG. 6, the step of determining the ToF spectrum data of the positioning signal according to the positioning signal sent via multi-channels by the terminal to be positioned includes the following steps.

At S602, Fourier transform is performed on the positioning signal sent via multi-channels by the terminal to be positioned, so as to obtain multi-channel frequency-domain signals.

As at least one alternative embodiment, a base station receives the positioning signal with a known sequence, which is sent by the terminal to be positioned, by means of the antenna array. Since the positioning signal is a time-domain signal, Fast Fourier Transform (FFT) may be first performed on each channel receiving signal, so as to obtain the multi-channel frequency-domain signal. The antenna array may include N array elements, and each array element corresponds to a receiving channel. If the number that a broadband positioning signal occupies sub-bands is M, a frequency-domain positioning signal received by the receiving channel n may be represented as a vector $$x_n = [X_{1,n}, X_{2,n}, \ldots , X_{M,n}]^T,$$

where $X_{m,n}$ represents the frequency-domain positioning signal, which is received by the $n^{th}$ receiving channel at the $m^{th}$ sub-band.

$$x_n \in C^{M\times 1},$$

where $\mathbb{C}$ represents a complex space, and $C^{M\times 1}$ represents a M*1-dimensional complex space, which is an M-dimensional complex vector space. In the present disclosure, the vectors all refer to column vectors.

Receiving data matrices of all channels of the base station may be represented as $$X = [x_1, x_2, \ldots , x_N] \in C^{M\times N},$$

which is the multi-channel frequency-domain signal. The sequence of the positioning signal sent on M sub-bands is S⌈m⌉, m=1, 2, . . . , M; and a sending signal center carrier frequency is $f_c$, and the corresponding wavelength is $\lambda=c/f_c$, where c is the speed of light in vacuum. Without losing generality, assuming that the M sub-bands are uniformly distributed, a distribution interval is $\Delta f$; and assuming that a receiving antenna array is a Uniform Linear Array (ULA), and an array element interval is d. In addition, assuming that a transmission signal is propagated to the receiving array from K paths; and the ToF, AoA, and fading coefficient of the $k^{th}$ path respectively are $\tilde{\tau}_k$, $\hat{\theta}_k$, $\hat{\gamma}$k. $\hat{\theta}_k$ is defined as an included angle between a signal incident direction and a ULA normal direction. The delay of signal transmission may represent the distance of signal transmission, and the delay and the distance may be mutually transformed by means of the speed of light c. Therefore, the multi-channel receiving signal matrix X may also be represented as $$X = \sum_{k=1}^{K} \left[\tilde{\gamma}_k S \cdot a_\tau(\tilde{\tau}_k) a_\theta'^T(\tilde{\theta}_k)\right] \odot \Upsilon + W. \tag{1}$$

In the equation (1), $$S = \mathrm{diag}\left([S[1], S[2], \ldots , S[M]]^T\right)$$

is a positioning sequence data matrix of the positioning signal; and the diag(•) operator indicates that a diagonal matrix is obtained by using each element of the vector as the main diagonal element.

In the equation (1), $$a_\tau(\cdot) \in T \to C^{M\times 1}$$

is a delay domain matching vector function, with an input being ToF $\tau$, and an output being a delay domain matching vector. For example, $$T \to C^{M\times 1}$$

indicates that the action scope of the function is T, a range is an M-dimensional delay domain matching vector, and T is a set of all possible path delay $\tau$, that is, $$\tau \in T \subseteq R,$$

where $\mathbb{R}$ represents a real number space. The $m^{th}$ element of the delay domain matching vector indicates a phase deviation caused by signal ToF at the $m^{th}$ sub-band, and thus, there is $$a_\tau(\tilde{\tau}_k)|_m = \exp(-j2\pi(m-1)\Delta f \tilde{\tau}_k),\ m = 1, 2, \ldots , M,$$

j represents an imaginary unit and is defined as $$j=\sqrt{-1},$$

and the distribution interval is Δf.

In the equation (1), $$a'_{\theta}(\cdot)\in\Theta\to C^{N\times 1}.$$

represents an actual receiving array steering vector function, with an input being signal AoA θ, and an output being an array steering vector of the corresponding AoA. For example, $$\Theta\to C^{N\times 1}$$

indicates that an action scope is Θ, a range is an N-dimensional vector, and Θ is a space that is formed by all possible incident signal AoA, that is, $$\theta\in\Theta\subseteq R.\ \text{Further, } a'_{\theta}(\tilde{\theta}_k)=a_{\theta}(\tilde{\theta}_k)\odot\zeta(\tilde{\theta}_k),\ \text{where } a_{\theta}(\tilde{\theta}_k).$$

is an ideal array steering vector. When the receiving array is the ULA, the $n^{th}$ element is $$a_{\theta}(\tilde{\theta}_k)\big|_n=\exp\left(j2\pi\frac{(n-1)d\sin\tilde{\theta}_k}{\lambda}\right),\ n=1,2,\ldots,N;$$

$\zeta(\tilde{\theta}_k)$ represents a disturbance term that is caused by an angle dependent phase deviation, which is jointly caused by factors such as antenna planning and mutual coupling between array elements, and the amplitude pattern of the antenna array element, that is, the antenna array deviation function, which represents the deviation between a real array response and an ideal array response, and the $n^{th}$ element is $$\zeta(\tilde{\theta}_k)\big|_n=\rho_n(\tilde{\theta}_k)\cdot\exp\left(j\Phi_n(\tilde{\theta}_k)\right).$$

In the equation, $$\rho_n(\cdot)\in\Theta\to R$$

represents an amplitude pattern function on the $n^{th}$ array element, with an input being the signal AoA θ, and an output being an amplitude pattern of the $n^{th}$ array element.

$$\Phi_n(\cdot)\in\Theta\to[-\pi,+\pi]:$$

represents an angle dependent phase deviation function on the $n^{th}$ array element, with an input being the signal AoA θ, and an output being a phase deviation of the $n^{th}$ array element at the corresponding AoA. The specific forms of $$\rho_n(\cdot):\ \text{and}\ \Phi_n(\cdot)$$

depends on the array antenna used, and the values of $$\rho_n(\cdot):\ \text{and}\ \Phi_n(\cdot)$$

on certain AoA grids may be obtained by means of anechoic chamber measurements or numerical calculation of electromagnetic simulation software. The phase deviation function plays a decisive role in AoA estimation. Generally, when θ is small, $\phi_n(\theta)$ is close to 0; and when θ is large, there are significant fluctuations in $\phi_n(\theta)$. An operator ⊙ represents a Hadamard product.

In the equation (1), $$\Upsilon\in C^{M\times N}:$$

is a broadband response of an analog device such as a front-end amplifier, a filter, and a mixer of the receiving channel of the base station, and the element at the $m^{th}$ row and $n^{th}$ column is a response of the $n^{th}$ receiving channel at the $m^{th}$ sub-band.

$$W\in C^{M\times N}$$

is a noise matrix, and the element at the $m^{th}$ row and $n^{th}$ column indicates a noise component of the $n^{th}$ receiving channel on the $m^{th}$ sub-band.

At S604, channel estimation is performed on the multi-channel frequency-domain signals, so as to obtain a CFR matrix.

As at least one alternative embodiment, the base station may perform channel estimation by using an LS method according to a frequency-domain receiving signal matrix X, so as to obtain a CFR matrix, which is recorded as $H_0$. For example, assuming that a receiver has known the specific form of the positioning signal in a frequency domain, and has acquired a positioning sequence of the positioning signal, the receiver performs determination according to the positioning sequence, and performs channel estimation by using a classical LS algorithm, $$H_0=S^{-1}X$$

may be obtained. In the equation, $$H_0\in C^{M\times N},$$

the $n^{th}$ column is the CFR matrix of the $n^{th}$ receiving channel, and $S^{-1}$ is an inverse matrix of a positioning sequence data matrix $$S = \mathrm{diag}([S[1], S[2], \ldots, S[M]]^T)$$

of the positioning signal. The CFR matrix may also be represented as $$H_0 = S^{-1}X = \sum_{k=1}^{K} [\tilde{\gamma}_k \cdot a_\tau(\tilde{\tau}_k) a_\theta'^T(\tilde{\theta}_k)] \odot Y + S^{-1}W.$$

At S606, the ToF spectrum data is acquired on the basis of the CFR matrix.

As at least one alternative embodiment, super-resolution ToF spectrum estimation is performed on each receiving channel according to the CFR matrix $H_0$. $h_n$, n=1, . . . , N is set to be the $n^{th}$-column element of the matrix $H_0$, representing the CFR of the $n^{th}$ receiving channel. Then $h_n$ may be represented as $$h_n \approx \sum_{k=1}^{K} [\alpha_{n,k} \tilde{\gamma}_k \cdot a_\tau(\Delta \tilde{\tau}_k)] + w_n.$$

In the equation, $\alpha_{n,k}$ indicates the response of the $n^{th}$ receiving array element to the incident signal of the $k^{th}$ path, and is the $n^{th}$ element of a vector $$a_\theta'(\tilde{\theta}_k).$$

In the equation, $$w_n \in C^{M \times 1}$$

indicates a noise vector of the channel, and is the $n^{th}$ column of a matrix W'. ToF spectrum estimation is performed on the fading coefficient on the delay region of interest by means of scanning, and scanning delay corresponding to the ToF spectrum peak point represents the ToF of a strong path. By dividing a delay range $[\tau_{min}, \tau_{max}]$ into P portions at equal intervals, generally P>>K (the number of paths), delay corresponding to P scanning grid points may respectively be $$\tau_p, p = 1, \ldots, P. \ \beta_{n,p}, p = 1, \ldots, P$$

is recorded as the fading coefficient on each scanning grid point. When $$\tau_p = \tilde{\tau}_k, \beta_{n,p} = \alpha_{n,k} \tilde{Y}_k,$$

and on other P-K grid points, $$\beta_{n,p} = 0. \ \beta_n = [\beta_{n,1}, \beta_{n,2}, \ldots, \beta_{n,P}]^T$$

is recorded as a fading coefficient vector on the scanning grid point set, that is, the ToF spectrum data, and $A_\tau = [a_\tau(\tau_1), \ldots, a_\tau(\tau_p)]$ is a delay matching matrix on the scanning grid point set. Then $h_n \approx A_\tau \beta_n + w_n$, n=1, . . . , N is obtained.

The spectrum estimation problem may be solved by using various parameter estimation methods, for example, a single point LS algorithm, an APES algorithm, an IAA, and a sparse reconstruction algorithm. For example, for ToF spectrum estimation of the $n^{th}$ channel, $h_n$, $$A_\tau = [a_\tau(\tau_1), \ldots, a_\tau(\tau_P)], \text{ and } \beta_{n,p}, p = 1, \ldots, P$$

are substituted into an objective function $$\underset{\beta_{n,p}}{\operatorname{argmin}} \|h_n - \beta_{n,p} a_\tau(\tau_p)\|^2_{R^{-1}_{n,p}}, p = 1, 2, \ldots, P,$$

$\beta_{n,p}$, p=1, . . . , P is obtained by using the IAA.

$$\|x\|_Q^2 = x^H Q x$$

represents the weighted $l_2$ norm of the vector X. $R_{n,p}$ represents an interference covariance matrix of the $n^{th}$ receiving channel at the $p^{th}$ scanning grid point, and the interference is formed by the signal components other than the current grid point $\tau_p$. Alternatively, $$h_n, A_\tau = [a_\tau(\tau_1), \ldots, a_\tau(\tau_P)], \text{ and } \beta_{n,p}, p = 1, \ldots, P$$

may also be substituted into an objective function for the $\ell_1$ norm-based sparse reconstruction algorithm $$\min_{\beta_{n,p}} \left\| h_n - \sum_{p=1}^{P} \beta_{n,p} a_\tau(\tau_p) \right\|^2, \text{ s.t. } \|\beta_n\|_1 \le \eta,$$

and $\beta_{n,p}$, p=1, . . . , P is obtained through spectrum solution, where $\|X\|_1$ represents a $\ell_1$ norm of a P-dimensional vector X, and is defined as $$\|x\|_1 = \sum_{p=1}^{P} |x_p|.$$

Further as shown in FIG. 7, the step of acquiring the ToF spectrum data on the basis of the CFR matrix includes the following steps.

At S702, a channel calibration coefficient is acquired, and the CFR matrix is corrected according to the channel calibration coefficient, so as to obtain a corrected CFR matrix.

As at least one alternative embodiment, the γ amplitude-phase responses of each receiving channel on each frequency point are different, leading to a term in the equation (1). Generally, the γ matrix may be obtained through measurement before a positioning experiment or obtained through measurement using a special correction channel in the positioning experiment. Assuming that a channel amplitude-phase response matrix obtained through measurement is $\hat{\gamma}$. Since the matrix $\hat{\gamma}$ is configured to perform channel correction, the matrix is also generally called a channel calibration coefficient, or simply called a channel coefficient. The CFR matrix obtained through channel amplitude-phase deviation correction is recorded as H, and then the element at the $m^{th}$ row and $n^{th}$ column is $$H|_{(m,n)} = \frac{H_0|_{(m,n)}}{\hat{\Upsilon}|_{(m,n)}},$$

where $H_0|_{(m,n)}$ indicates the element at the $m^{th}$ row and $n^{th}$ column of the CFR matrix H0 before correction, and $\hat{\gamma}|_{(m,n)}$ indicates the element at the $m^{th}$ row and $n^{th}$ column of a channel calibration coefficient matrix $\hat{\gamma}$. Assuming that a measurement error of a channel amplitude-phase response is negligible, $$H \approx \sum_{k=1}^{K} \left[\tilde{\gamma}_k \cdot a_\tau(\tilde{\tau}_k) a_\theta'^T(\tilde{\theta}_k)\right] + W'.$$

In the equation, $$W' \in C^{M \times N}$$

indicates a noise component in the CFR matrix after channel amplitude-phase deviation correction.

At S704, the ToF spectrum data is acquired according to the corrected CFR matrix.

As at least one alternative embodiment, $h_n$, n=1, . . . , N is set to be the $n^{th}$-column element of the matrix H, representing the CFR of the $n^{th}$ receiving channel. Then $h_n$ may be represented as $$h_n \approx \sum_{k=1}^{K} [\alpha_{n,k}\tilde{\gamma}_k \cdot a_\tau(\Delta\tilde{\tau}_k)] + w_n.$$

In the equation, $\alpha_{n,k}$ indicates the response of the $n^{th}$ receiving array element to the incident signal of the $k^{th}$ path, and is the $n^{th}$ element of a vector $a_\theta'(\tilde{\theta}_k)$. In the equation, $w_n \in C^{M\times 1}$ indicates a noise vector of the channel, and is the $n^{th}$ column of a matrix W'. ToF spectrum estimation is performed on the fading coefficient on the delay region of interest by means of scanning, and scanning delay corresponding to the ToF spectrum peak point represents the ToF of a strong path. By dividing the delay range $[\tau_{min}, \tau_{max}]$ of interest into the P portions at equal intervals, generally P>>K (the number of paths), delay corresponding to the P scanning grid points respectively is $$\tau_p,\ p = 1, \dots, P.\ \beta_{n,p},\ p = 1, \dots, P$$

is recorded as the fading coefficient on each scanning grid point. When $$\tau_p = \tilde{\tau}_k,\ \beta_{n,p} = \alpha_{n,k}\tilde{\gamma}_k,$$

and on other P-K grid points, $$\beta_{n,p} = 0.\ \beta_n = [\beta_{n,1}, \beta_{n,2}, \dots, \beta_{n,P}]^T$$

is recorded as a fading coefficient vector on the scanning grid point set, that is, the ToF spectrum data, and $A_\tau=[a_\tau(\tau_1), \dots, a_\tau(\tau_P)]$ is a delay matching matrix on the scanning grid point set. Then $$h_n \approx A_\tau\beta_n + w_n,\ n = 1, \dots, N$$

The spectrum estimation problem may be solved by using various parameter estimation methods, for example, a single point LS algorithm, an APES algorithm, an IAA, and a sparse reconstruction algorithm. For example, for ToF spectrum estimation of the $n^{th}$ channel, $h_n$, $A_\tau=[a_\tau(\tau_1), \dots, a_\tau(\tau_p)]$, and the unknown $\beta_{n,p}$, p=1, . . . , P are substituted into an objective function $$\underset{\beta_{n,p}}{\operatorname{argmin}} \|h_n - \beta_{n,p} a_\tau(\tau_p)\|^2_{R^{-1}_{n,p}},\ p = 1, 2, \dots, P,$$

and $\beta_{n,p}$, p=1, . . . , P is obtained by using the IAA.

$$\|x\|^2_Q = x^H Q x$$

represents the weighted $l_2$ norm of the vector X. $R_{n,p}$ represents an interference covariance matrix of the $n^{th}$ receiving channel at the $p^{th}$ scanning grid point, and the interference is formed by the signal components other than the current grid point $\tau_p$. Alternatively, $h_n$, $A_\tau=[a_\tau(\tau_1), \dots, a_\tau(\tau_p)]$, and the unknown $\beta_{n,p}$, p=1, . . . , P may also be substituted into an objective function for the $\ell_1$ norm-based sparse reconstruction algorithm $$\min_{\beta_{n,p}} \left\| h_n - \sum_{p=1}^{P} \beta_{n,p} a_\tau(\tau_p) \right\|^2,\ \text{s.t.}\ \|\beta_n\|_1 \le \eta,$$

and $\beta_{n,p}$, p=1, . . . , P is obtained through spectrum solution, where $\|X\|_1$ represents a $\ell_1$ norm of a P-dimensional vector X, and is defined as $$\|x\|_1 = \sum_{p=1}^{P} |x_p|.$$

In this embodiment, Fourier transform is performed on the positioning signal sent via multi-channels by the terminal to be positioned, so as to obtain the multi-channel frequency-domain signal; channel estimation is performed on the multi-channel frequency-domain signal, so as to obtain the CFR matrix; and the ToF spectrum data is acquired on the basis of the CFR matrix. In this way, the received positioning signal is transformed, facilitating subsequent data analysis. In addition, the higher accuracy of the subsequently-determined ToF spectrum data and the AoA is further achieved by means of correcting the CFR matrix obtained according to the positioning signal.

In the above embodiment, the way of positioning signal processing and the way of determining the ToF spectrum data are described. When the positioning signal is processed, the CFR matrix formed by the positioning signal is corrected. Now, a calibration coefficient during correction is described with an embodiment. In an embodiment, as shown in FIG. 8, the step of acquiring the channel calibration coefficient includes the following steps.

At S802, a positioning sequence of each sub-band occupied by the positioning signal is acquired.

As at least one alternative embodiment, since the positioning signal sent by the terminal to be positioned has the known positioning sequence, the sequence of the positioning signal sent on M sub-bands is S[m], m=1, 2, . . . , M.

At S804, a positioning sequence matrix is constructed by using the positioning sequence of each sub-band.

As at least one alternative embodiment, a positioning sequence matrix $$S=\mathrm{diag}\left([S[1],\,S[2],\,\ldots\,,\,S[M]]^{T}\right)$$

is constructed by using the sequence S[m]m=1, 2, . . . , M of the positioning signal sent on the M sub-bands.

At S806, each element in the positioning sequence matrix is used as a main diagonal element, so as to obtain a diagonal matrix for channel estimation; and a channel amplitude-phase response matrix is measured as the channel calibration coefficient.

As at least one alternative embodiment, on the basis of $$S=\mathrm{diag}\left([S[1],\,S[2],\,\ldots\,,\,S[M]]^{T}\right)$$

in the positioning sequence matrix, a diag(•) operator indicates that a diagonal matrix is obtained by using each element of the vector as a main diagonal element.

In this embodiment, the positioning sequence of each sub-band occupied by the positioning signal is acquired; the positioning sequence matrix is constructed by using the positioning sequence of each sub-band; and each element in the positioning sequence matrix is used as the main diagonal element, so as to obtain the diagonal matrix for channel estimation; and the channel amplitude-phase response matrix is measured as the channel calibration coefficient. In this way, the channel calibration coefficient for correcting the CFR matrix can be determined, so as to correct the CFR matrix.

Figure 9:
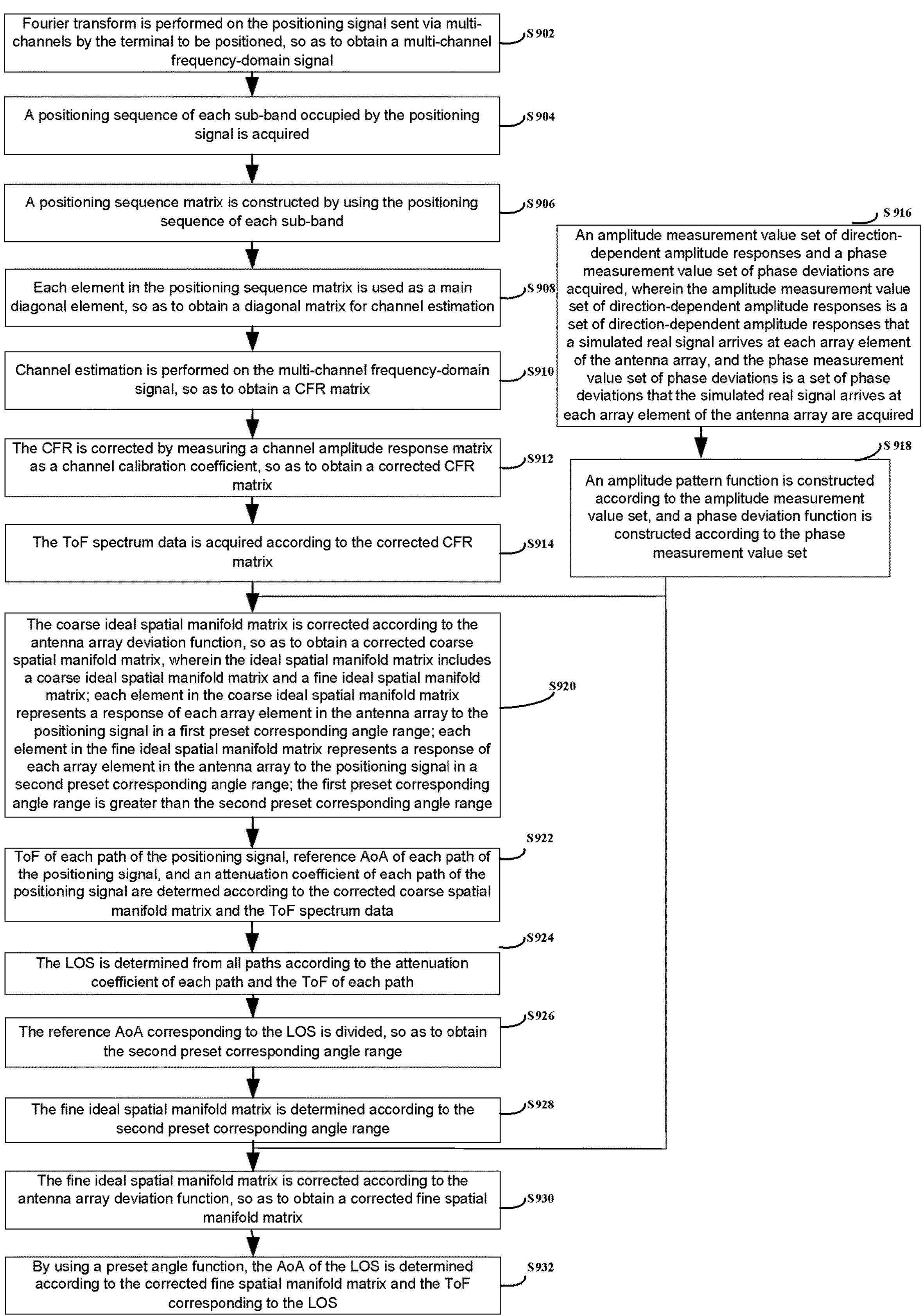
FIG. 9 is a schematic flowchart of a method for determining a positioning parameter according to another embodiment.

For ease of understanding by a person skilled in the art, the method for determining the positioning parameter is further described now with an embodiment. In an embodiment, as shown in FIG. 9, the method for determining the positioning parameter includes the following steps.

At S902, Fourier transform is performed on the positioning signal sent via multi-channels by the terminal to be positioned, so as to obtain a multi-channel frequency-domain signal.

At S904, a positioning sequence of each sub-band occupied by the positioning signal is acquired.

At S906, a positioning sequence matrix is constructed by using the positioning sequence of each sub-band.

At S908, each element in the positioning sequence matrix is used as a main diagonal element, so as to obtain a diagonal matrix for channel estimation.

At S910, channel estimation is performed on the multi-channel frequency-domain signal, so as to obtain a CFR matrix.

At S912, the CFR is corrected by measuring a channel amplitude response matrix as a channel calibration coefficient, so as to obtain a corrected CFR matrix.

At S914, the ToF spectrum data is acquired according to the corrected CFR matrix.

At S916, an amplitude measurement value set of direction-dependent amplitude responses and a phase measurement value set of phase deviations are acquired, wherein the amplitude measurement value set of direction-dependent amplitude responses is a set of direction-dependent amplitude responses that a simulated real signal arrives at each array element of the antenna array, and the phase measurement value set of phase deviations is a set of phase deviations that the simulated real signal arrives at each array element of the antenna array.

At S918, an amplitude pattern function is constructed according to the amplitude measurement value set, and a phase deviation function is constructed according to the phase measurement value set.

At S920, the coarse ideal spatial manifold matrix is corrected according to the antenna array deviation function, so as to obtain a corrected coarse spatial manifold matrix. The ideal spatial manifold matrix includes a coarse ideal spatial manifold matrix and a fine ideal spatial manifold matrix; each element in the coarse ideal spatial manifold matrix represents a response of each array element in the antenna array to the positioning signal in a first preset corresponding angle range; each element in the fine ideal spatial manifold matrix represents a response of each array element in the antenna array to the positioning signal in a second preset corresponding angle range; and the first preset corresponding angle range is greater than the second preset corresponding angle range.

At S922, ToF of each path of the positioning signal, reference AoA of each path, and an attenuation coefficient are determined according to the corrected coarse spatial manifold matrix and the ToF spectrum data.

At S924, the LOS is determined from all paths according to the attenuation coefficient of each path and the ToF of each path.

At S926, dividing is performed according to the reference AoA corresponding to the LOS, so as to obtain the second preset corresponding angle range.

At S928, the fine ideal spatial manifold matrix is determined according to the second preset corresponding angle range.

At S930, the fine ideal spatial manifold matrix is corrected according to the antenna array deviation function, so as to obtain a corrected fine spatial manifold matrix.

At S932, by using a preset angle function, AoA of the LOS is determined according to the corrected fine spatial manifold matrix and the ToF corresponding to the LOS.

Figure 10:
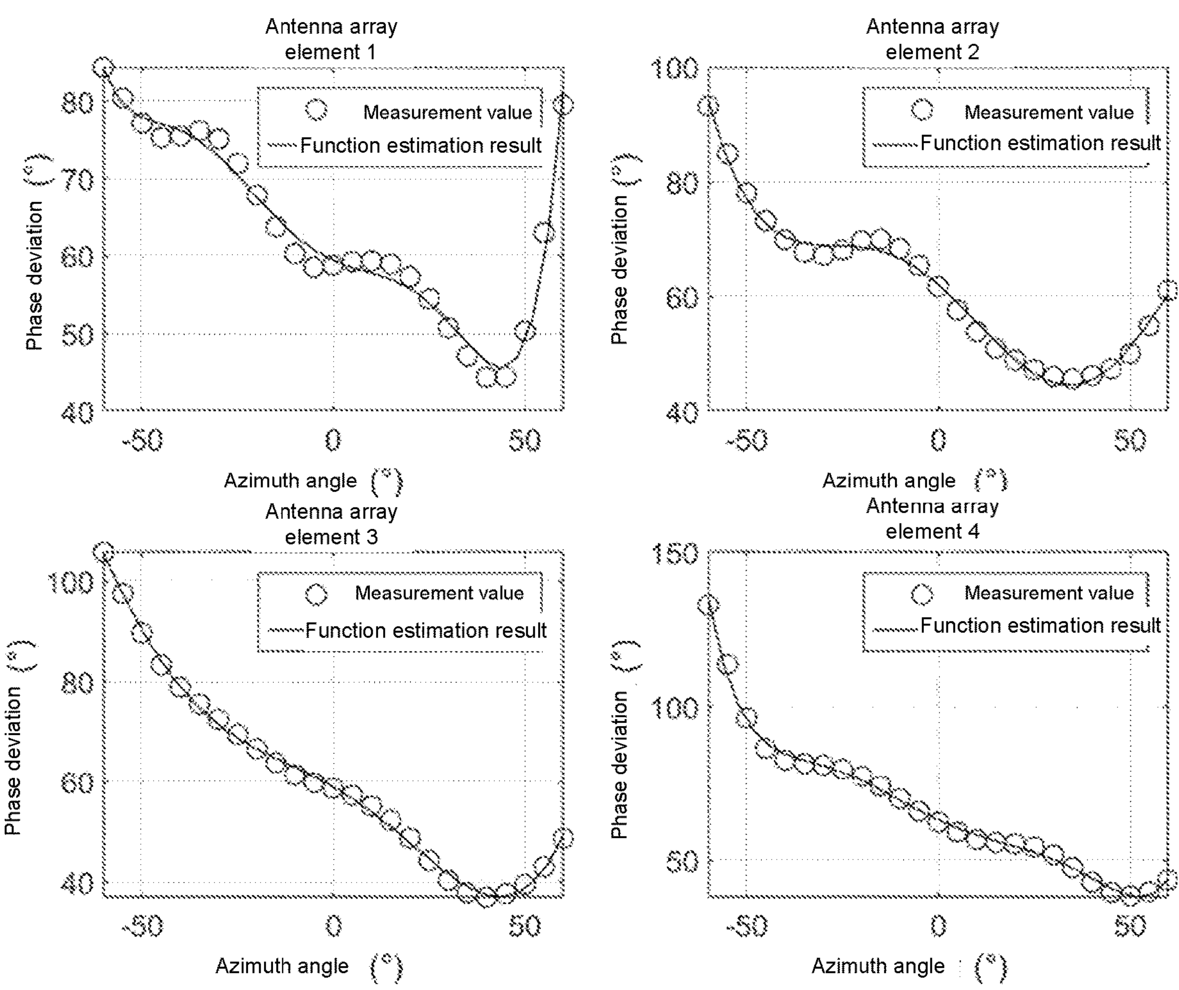
FIG. 10 shows a phase deviation function measurement value and a function estimation result according to another embodiment.
Figure 11:
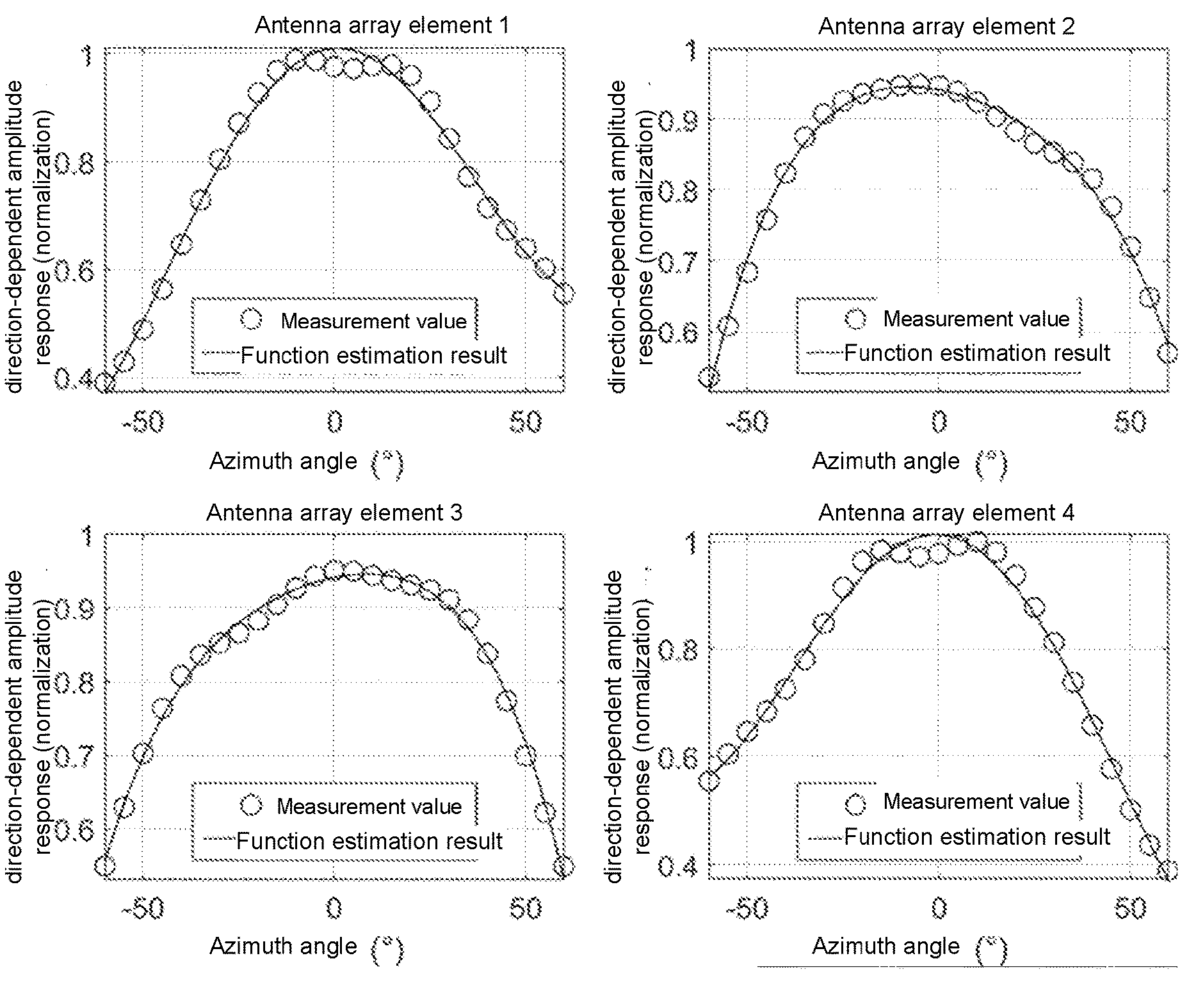
FIG. 11 shows an amplitude pattern function measurement value and a function estimation result according to another embodiment.

As at least one alternative embodiment, algorithm effectiveness is described by using an indoor positioning experiment based on an FR1 frequency band 5G system as an example. By using a 5G Sounding Reference Signal (SRS) as the positioning signal, the SRS is a broadband OFDM signal. During experiment, the positioning signal is configured to occupy 1632 sub-carriers, and the sub-carriers are spaced 60 kHz apart. During experiment, two 5G RRUs are used as receiving devices. Each RRU is provided with 4 array element ULAs, and the distance between the array elements is 5.8 cm. The array is placed horizontally. Before the positioning experiment starts, estimation of an antenna phase deviation coefficient function and an amplitude pattern function at an offline phase needs to be completed. Hollow circles shown in FIGS. 10 and 11 are samples of the phase deviation and amplitude pattern of each array element of the antenna array obtained through measurement in a sector region of −60° to 60° covered by the antenna array by using 5° as an interval in an anechoic chamber. The phase deviation function $\phi_n(\theta)$ and the amplitude pattern function $\rho_n(\theta)$, n=1, . . . 4 are estimated by using a polynomial fitting method. When the phase deviation function is estimated, a polynomial order used is 6, and phase deviation function curves obtained by estimating 4 antenna array elements respectively are shown by solid lines in FIG. 10. When the amplitude pattern function is estimated, the polynomial order used is 4, and amplitude pattern function curves obtained by estimating the 4 antenna array elements respectively are shown by solid lines in FIG. 11. From FIG. 10 and FIG. 11, it can be seen that, the phase deviation function and the amplitude pattern function, which are obtained by means of polynomial fitting, can better approach corresponding measurements in the anechoic chamber.

Figure 12:
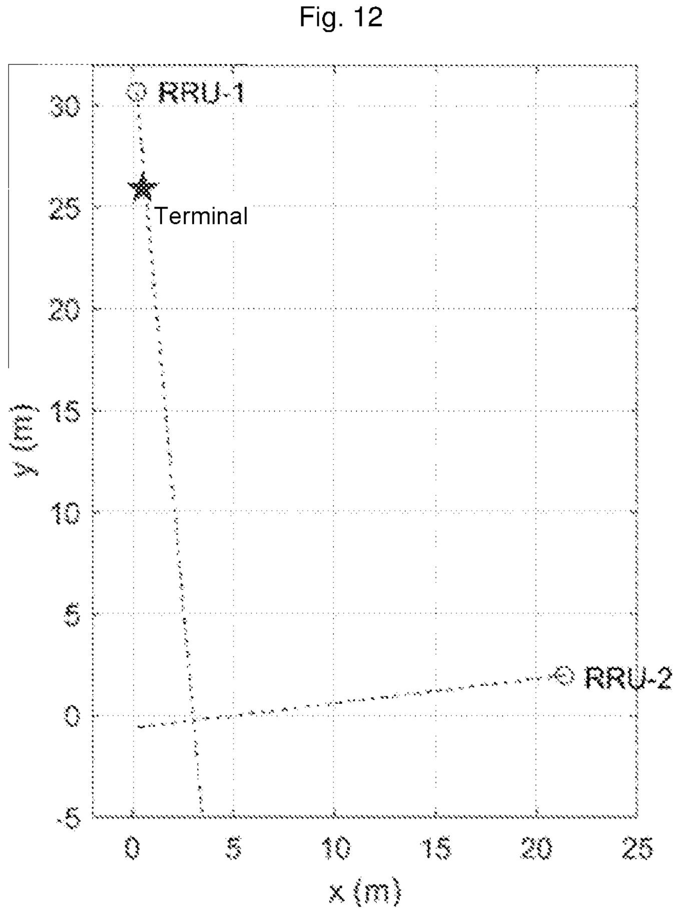
FIG. 12 is a diagram of a relative position of a Remote Radio Unit (RRU) and a terminal.

The positions of two RRUs are fixed, and the RRUs are placed in different relative positions of a terminal. Every time the terminal is stationary, 1500 consecutive SRS symbols are collected for positioning parameter estimation. A result that one RRU has large AoA relative to the terminal, and the other RRU has small AoA relative to the terminal is listed here, so as to describe the adaptability of the method provided in the present disclosure to a large AoA signal phase deviation. FIG. 12 shows a diagram of a relative position of an RRU and a terminal in an experiment. Dotted lines in the figure indicate normal directions of two RRU antenna arrays, and a five-pointed star is the position where the terminal of the experiment is located. It may be seen that, in this case, the terminal approaches the normal direction of RRU-1, and real AoA is −1.5°; and an angle that a terminal signal arrives at RRU-2 is large, and the real AoA is −55.8°.

Figure 13:
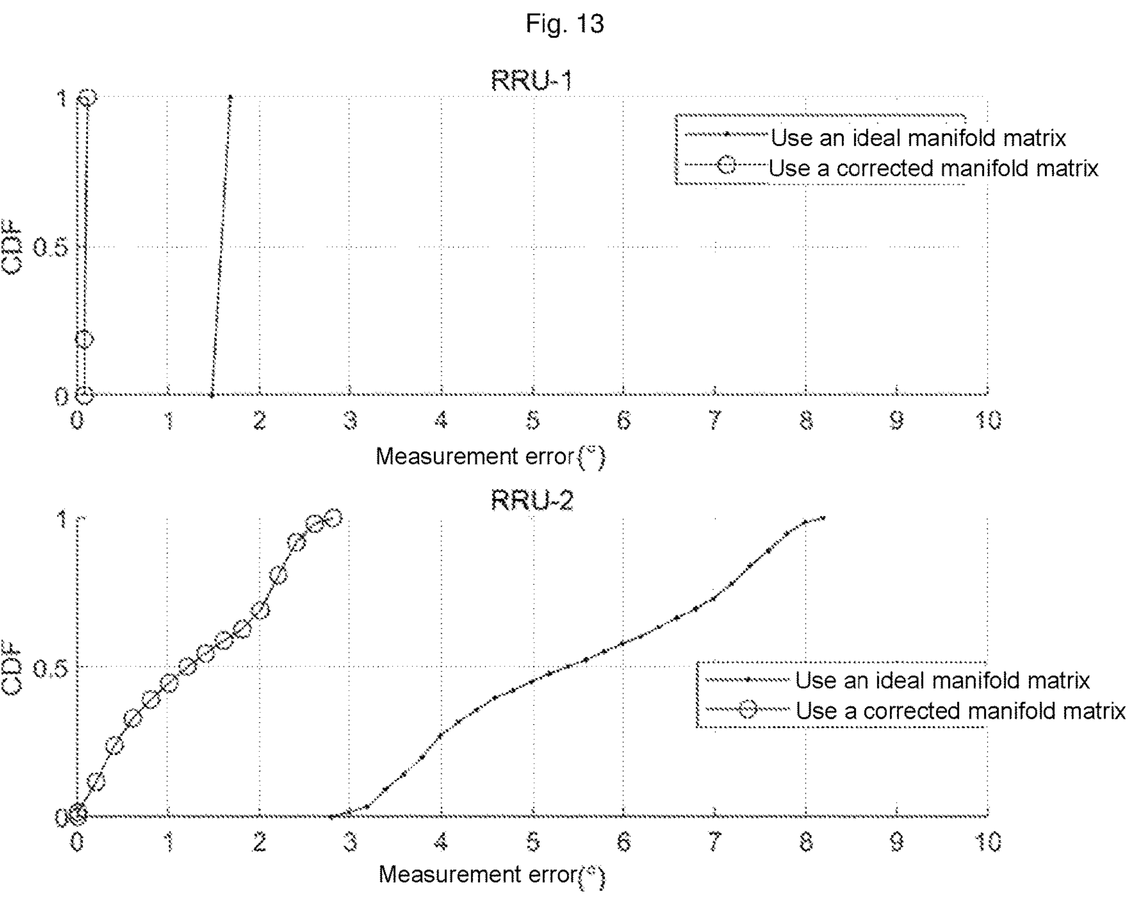
FIG. 13 is an AoA estimation error Cumulative Distribution Function (CDF) curve of an Sounding Reference Signal (SRS) symbol according to another embodiment.

SRS data of the two RRUs is processed by using the method provided in the present disclosure. AoA estimation Cumulative Distribution Function (CDF) curves of 1500 SRS symbols are shown by hollow circles in FIG. 13. For comparison, CDF curves obtained by processing an ideal spatial manifold matrix are also drawn in FIG. 13, and are expressed by solid points. From FIG. 13, it may be learned that, an antenna error includes the phase deviation among the array elements and a difference in antenna pattern among the array elements, and has significant angular correlation. At small AoA, the error is small, and an AoA estimation error caused is small; and at large AoA, the error is large, and the AoA estimation error caused is large. The antenna error related to the AoA is effectively compensated by correcting the manifold matrix, and the improvement is especially noticeable when a signal is at the large AoA.

In this embodiment, the ToF spectrum data of the positioning signal is determined according to the positioning signal sent via multi-channels by the terminal to be positioned; the ideal spatial manifold matrix is corrected according to the preset antenna array deviation function, so as to obtain the corrected spatial manifold matrix; and the positioning parameter of LOS of the positioning signal is determined according to the ToF spectrum data and the corrected spatial manifold matrix. The ideal spatial manifold matrix can be corrected by using the preset antenna array deviation function including a phase and an amplitude, so as to reduce the deviation between the response of a real antenna array to a signal and the response of an ideal antenna array to the signal, and the LOS, which is the shortest path from the terminal to be positioned to the antenna array, is determined, such that the accuracy of measuring the positioning parameter of the positioning signal is improved. In addition, the solution avoids the problem of high computational complexity caused by simultaneous measurement of the ToF and the AoA in the related art.

It is to be understood that, although the various steps in the flowcharts of FIGS. 2-9 are displayed in sequence as indicated by the arrows, these steps are not necessarily executed in sequence in the order indicated by the arrows. Unless otherwise specified herein, there is no strict order for the execution of these steps, and these steps can be executed in other orders. Moreover, at least part of the steps in FIGS. 2-9 may include a plurality of steps or a plurality of stages. These steps or stages are not necessarily executed at a same time, but can be executed at different times. These steps or stages are not necessarily executed in sequence, but may be executed in turns or alternately with other steps or at least a part of the steps or stages in other steps.

Figure 14:
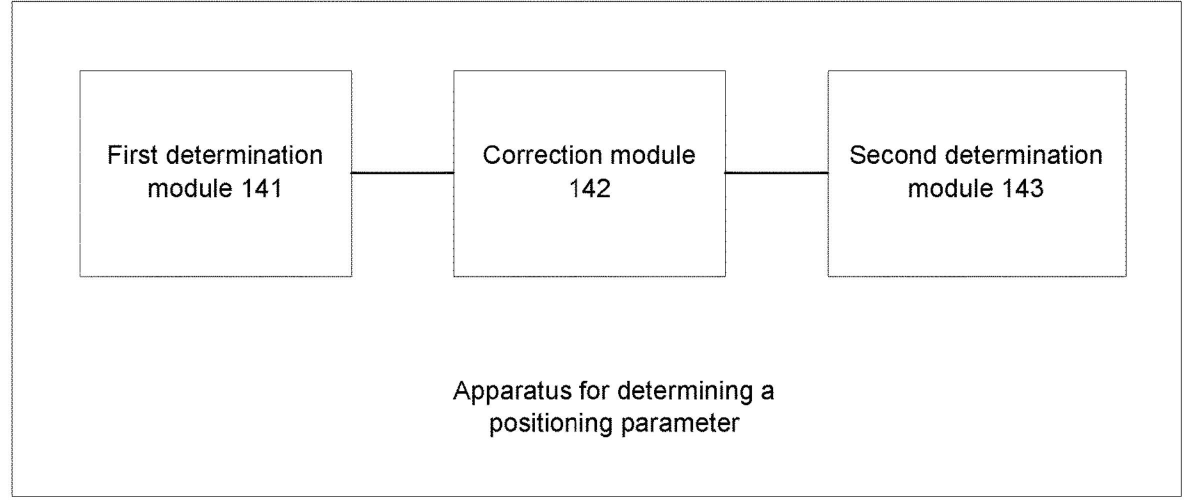
FIG. 14 is a structural block diagram of an apparatus for determining a positioning parameter according to an embodiment.

In an embodiment, as shown in FIG. 14, provided is an apparatus for determining a positioning parameter, which includes a first determination module, a correction module, and a second determination module.

The first determination module 141 is configured to determine ToF spectrum data of a positioning signal according to the positioning signal sent via multi-channels by a terminal to be positioned.

The correction module 142 is configured to correct an ideal spatial manifold matrix according to a preset antenna array deviation function, so as to obtain a corrected spatial manifold matrix. Each element in the ideal spatial manifold matrix or the corrected spatial manifold matrix represents a response of each array element in an antenna array to the positioning signal in a preset corresponding angle range, and the antenna array deviation function represents the deviation between a response of a real antenna array to a signal and a response of an ideal antenna array to the signal.

The second determination module 143 is configured to determine a positioning parameter of LOS of the positioning signal according to the ToF spectrum data and the corrected spatial manifold matrix, wherein the LOS is the shortest path from the terminal to be positioned to the antenna array.

In this embodiment, the first determination module determines the ToF spectrum data of the positioning signal according to the positioning signal sent via multi-channels by the terminal to be positioned; the correction module corrects the ideal spatial manifold matrix according to the preset antenna array deviation function, so as to obtain the corrected spatial manifold matrix; and the second determination module determines the positioning parameter of the LOS of the positioning signal according to the ToF spectrum data and the corrected spatial manifold matrix. The ideal spatial manifold matrix can be corrected by using the preset antenna array deviation function including a phase and an amplitude, so as to reduce the deviation between the response of a real antenna array to a signal and the response of an ideal antenna array to the signal, and the LOS, which is the shortest path from the terminal to be positioned to the antenna array, is determined, such that the accuracy of measuring the positioning parameter of the positioning signal is improved. In addition, the solution avoids the problem of high computational complexity caused by simultaneous measurement of the ToF and the AoA in the related art.

Figure 15:
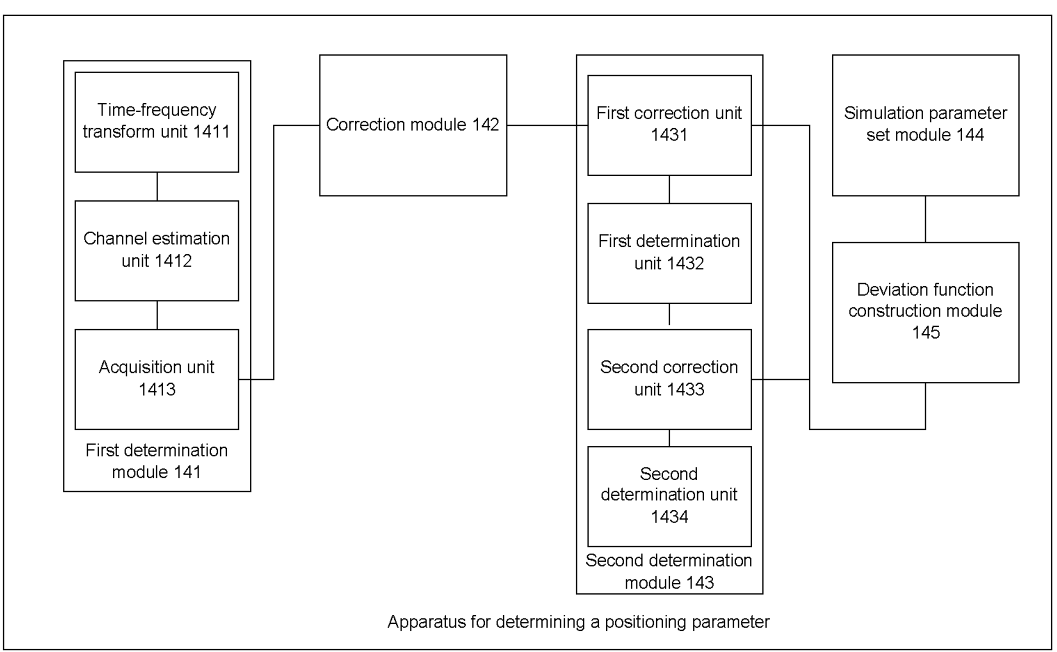
FIG. 15 is a structural block diagram of an apparatus for determining a positioning parameter according to another embodiment.

In an embodiment, as shown in FIG. 15, the apparatus for determining the positioning parameter further includes a simulation parameter set module 144 and a deviation function construction module 145.

The simulation parameter set module 144 is configured to acquire an amplitude measurement value set of direction-dependent amplitude responses and a phase measurement value set of phase deviations, wherein the amplitude measurement value set of direction-dependent amplitude responses is a set of direction-dependent amplitude responses that a simulated real signal arrives at each array element of the antenna array, and the phase measurement value set of phase deviations is a set of phase deviations that the simulated real signal arrives at each array element of the antenna array.

The deviation function construction module 145 is configured to construct an amplitude pattern function according to the amplitude measurement value set, and construct a phase deviation function according to the phase measurement value set; and determine the antenna array deviation function according to the amplitude pattern function and the phase deviation function.

In an embodiment, as shown in FIG. 15, the positioning parameter includes AoA and ToF The second determination module 143 includes a first correction unit 1431, a first determination unit 1432, a second correction unit 1433, and a second determination unit 1434.

The first correction unit 1431 is configured to correct the coarse ideal spatial manifold matrix according to the antenna array deviation function, so as to obtain a corrected coarse spatial manifold matrix.

The first determination unit 1432 is configured to determine, according to the corrected coarse spatial manifold matrix and the ToF spectrum data, the fine ideal spatial manifold matrix and ToF corresponding to the LOS.

The second correction unit 1433 is configured to correct the fine ideal spatial manifold matrix according to the antenna array deviation function, so as to obtain a corrected fine spatial manifold matrix.

The second determination unit 1434 is configured to, by using a preset angle function, determine AoA of the LOS according to the corrected fine spatial manifold matrix and the ToF corresponding to the LOS.

In an embodiment, the first determination unit 1432 is configured to: determine, according to the corrected coarse spatial manifold matrix and the ToF spectrum data, ToF of each path of the positioning signal, reference AoA of each path, and an attenuation coefficient of each path; determine the LOS from paths according to the attenuation coefficient of each path and the ToF of each path; divide according to the reference AoA corresponding to the LOS, so as to obtain the second preset corresponding angle range; determine the fine ideal spatial manifold matrix according to the second preset corresponding angle range; and determine the ToF corresponding to the LOS according to the ToF of each path and the attenuation coefficient of each path.

In an embodiment, as shown in FIG. 15, the first determination unit 1432 is configured to: determine two-dimensional positioning parameter spectrum data according to the corrected coarse spatial manifold matrix and the ToF spectrum data; and perform spectrum peak extraction according to the two-dimensional positioning parameter spectrum data, so as to obtain the ToF of each path of the positioning signal, the reference AoA of each path, and the attenuation coefficient of each path.

In an embodiment, as shown in FIG. 15, the first determination module 141 includes a time-frequency transform unit 1411, a channel estimation unit 1412, and an acquisition unit 1413.

The time-frequency transform unit 1411 is configured to perform Fourier transform on the positioning signal sent via multi-channels by the terminal to be positioned, so as to obtain a multi-channel frequency-domain signal.

The channel estimation unit 1412 is configured to perform channel estimation on the multi-channel frequency-domain signal, so as to obtain a CFR matrix.

The acquisition unit 1413 is configured to acquire the ToF spectrum data on the basis of the CFR matrix.

In an embodiment, the acquisition unit 1413 is configured to: acquire a channel calibration coefficient, and correct the CFR matrix according to the channel calibration coefficient, so as to obtain a corrected CFR matrix; and acquire the ToF spectrum data according to the corrected CFR matrix.

In an embodiment, the channel estimation unit 1412 is configured to: acquire a positioning sequence of each sub-band occupied by the positioning signal; construct a positioning sequence matrix by using the positioning sequence of each sub-band; and use each element in the positioning sequence matrix as a main diagonal element, so as to obtain a diagonal matrix for channel estimation. The acquisition unit 1413 is configured to measure a channel amplitude-phase response matrix as the channel calibration coefficient.

For the specific limitation on the positioning parameter determination apparatus may refer to the limitation on the method for determining the positioning parameter above, and the details are not described herein again. The technical features and beneficial effects thereof set forth in the above embodiments of the method for determining the positioning parameter are all applicable in the embodiments of the positioning parameter determination apparatus, the details of which may be found in the description in the embodiments of the method for determining the positioning parameter of the present disclosure.

Each module in the positioning parameter determination apparatus may be implemented entirely or partly by software, hardware, or a combination thereof. The foregoing modules may be embedded in or independent of a processor in a computer device in the form of hardware, or may be stored in a memory in the computer device in the form of software, such that the processor calls and executes the operations corresponding to the foregoing modules.

An embodiment provides a computer device. The computer device may be a terminal. An internal structure diagram of the terminal may be shown in FIG. 16. The computer device includes a processor, a memory, a communication interface, a display screen, and an input apparatus, which are connected by using a system bus. The processor of the computer device is configured to provide calculation and control capabilities. The memory of the computer device includes a non-volatile storage medium or an internal memory. The non-volatile storage medium stores an operating system and a computer program. The internal memory provides an environment for the running of the operating system and the computer program in the non-volatile storage medium. The communication interface of the computer device is used for wired or wireless communication with an external terminal. The wireless communication may be implemented by Wi-Fi, an operator network, near field communication (NFC), or other technologies. The computer program implements the method for determining the positioning parameter when being executed by the processor. The display screen of the computer device may be a liquid crystal display screen or an electronic ink display screen. The input apparatus of the computer device may be a touch layer covered on the display screen, may be a button, a trackball or a touch-control panel which are provided on a housing of the computer device, or may be an external keyboard, touch-control panel, or mouse.

Figure 16:
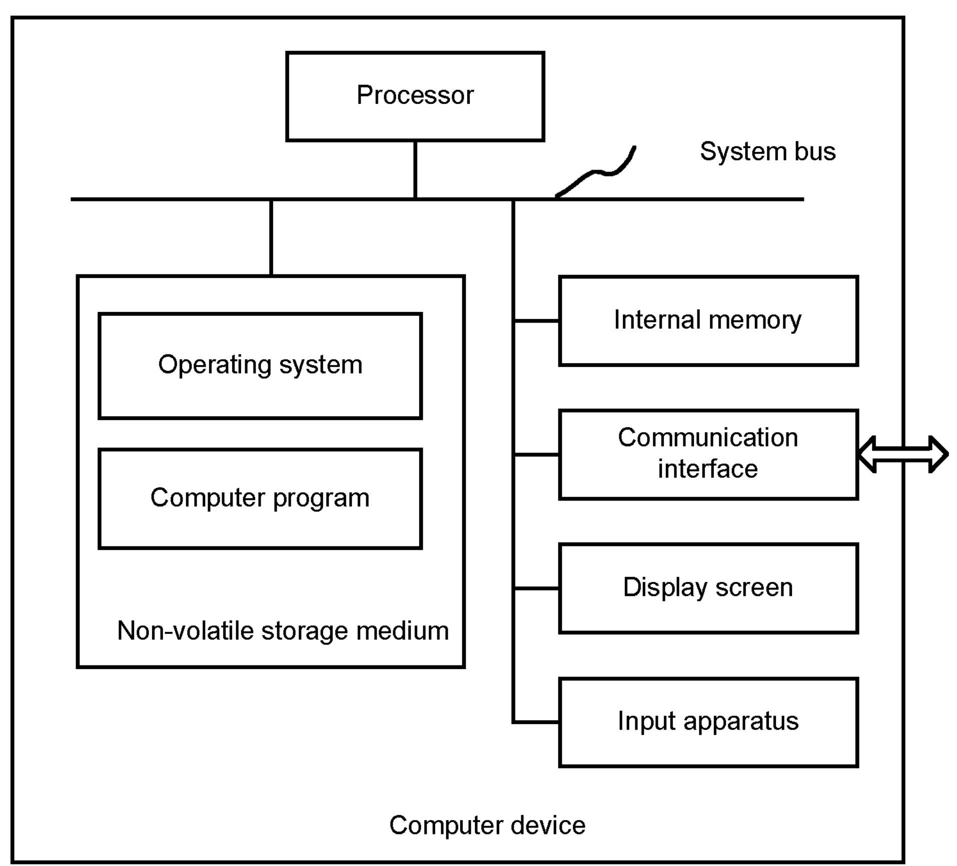
FIG. 16 is an internal structure diagram of a computer device according to an embodiment.

It may be understood by those skilled in the art that the structure shown in FIG. 16, which is only a block diagram of a portion of the structure associated with the solutions of the present disclosure, does not constitute a limitation of the computer device to which the solutions of the present disclosure are applied. The specific computer device may include more or fewer components than shown in the figures, or be combined with certain components, or have a different arrangement of components.

An embodiment further provides a computer device, which includes a memory and a processor. The memory stores a computer program. The processor implements the operations in the foregoing method embodiments when executing the computer program.

An embodiment provides a computer-readable storage medium, which stores a computer program, the computer program, when executed by a processor, implementing the operations in the foregoing method embodiments.

The steps implemented in the above embodiments of the computer device and the computer-readable storage medium correspond to the steps of the foregoing positioning parameter determination method, and the technical features and beneficial effects thereof elaborated in the above embodiments of the method for determining the positioning parameter are applicable to the embodiments of the computer device and the computer-readable storage medium, and the specific limitations may refer to the above limitations for the method for determining the positioning parameter, which are described herein again.

Those of ordinary skill in the art will appreciate that implementing all or part of the processes in the methods described above may be accomplished by instructing associated hardware by a computer program, which may be stored in a non-volatile computer-readable storage medium, which, when executed, may include processes as embodiments of the methods described above. Any reference to the memory, storage, the database, or other media used in the embodiments provided in this application may include at least one of a non-volatile memory or a volatile memory. The non-volatile memory may include a Read-Only Memory (ROM), a magnetic tape, a floppy disk, a flash memory, an optical memory, or the like. The volatile memories may include a Random Access Memory (RAM), or an external cache memory. By way of description and not limitation, the RAM may be in various forms, such as a Static Random Access Memory (SRAM), a Dynamic Random Access Memory (DRAM), or the like.

Various technical features of the above embodiments may be combined arbitrarily. For brevity of description, description is not made to all possible combinations of the various technical features of the above embodiments are described. However, all the combinations of these technical features should be considered to fall within the scope of disclosure contained in the specification as long as there is no contradiction between the combinations of those technical features.

The above embodiments merely illustrate several implementations of the present disclosure, which are specifically described in detail, but are not to be construed as limiting the scope of the present patent for the present disclosure. It should be pointed out that, those of ordinary skill in the art can also make some modifications and improvements without departing from the concept of the present disclosure, and these modifications and improvements all fall within the scope of protection of the present disclosure. Accordingly, the scope of the patent of the present disclosure should be subject to the appended claims.

What is claimed is:

1. A method for determining a positioning parameter, comprising:

determining Time of Flight (ToF) spectrum data of a positioning signal according to the positioning signal sent via multi-channels by a terminal to be positioned;

correcting an ideal spatial manifold matrix according to a preset antenna array deviation function, so as to obtain a corrected spatial manifold matrix, wherein each element in the ideal spatial manifold matrix or the corrected spatial manifold matrix represents a response of each array element in an antenna array to the positioning signal in a preset corresponding angle range, and the preset antenna array deviation function represents a deviation between a response of a real antenna array to a signal and a response of an ideal antenna array to the signal; and determining the positioning parameter of a Line Of Sight (LOS) of the positioning signal according to the ToF spectrum data and the corrected spatial manifold matrix, wherein the LOS is a shortest path from the terminal to be positioned to the antenna array.

2. The method as claimed in claim 1, wherein a process of constructing the preset antenna array deviation function comprises:

acquiring an amplitude measurement value set of direction-dependent amplitude responses and a phase measurement value set of phase deviations, wherein the amplitude measurement value set of direction-dependent amplitude responses is a set of direction-dependent amplitude responses that a simulated real signal arrives at each array element of the antenna array, and the phase measurement value set of phase deviations is a set of phase deviations that the simulated real signal arrives at each array element of the antenna array;

constructing an amplitude pattern function according to the amplitude measurement value set, and constructing a phase deviation function according to the phase measurement value set; and determining the preset antenna array deviation function according to the amplitude pattern function and the phase deviation function.

3. The method as claimed in claim 1, wherein the ideal spatial manifold matrix comprises a coarse ideal spatial manifold matrix and a fine ideal spatial manifold matrix; each element in the coarse ideal spatial manifold matrix represents a response of each array element in the antenna array to the positioning signal in a first preset corresponding angle range; each element in the fine ideal spatial manifold matrix represents a response of each array element in the antenna array to the positioning signal in a second preset corresponding angle range; the first preset corresponding angle range is greater than the second preset corresponding angle range.

4. The method as claimed in claim 3, wherein the positioning parameter comprises an Angle of Arrival (AoA) and a ToF; and determining the positioning parameter of the LOS of the positioning signal according to the ToF spectrum data and the corrected spatial manifold matrix comprises:

correcting the coarse ideal spatial manifold matrix according to the preset antenna array deviation function, so as to obtain a corrected coarse spatial manifold matrix;

determining the fine ideal spatial manifold matrix and the ToF corresponding to the LOS according to the corrected coarse spatial manifold matrix and the ToF spectrum data;

correcting the fine ideal spatial manifold matrix according to the preset antenna array deviation function, so as to obtain a corrected fine spatial manifold matrix; and determining by a preset angle function, the AoA of the LOS according to the corrected fine spatial manifold matrix and the ToF corresponding to the LOS.

5. The method as claimed in claim 4, wherein determining the fine ideal spatial manifold matrix according to the corrected coarse spatial manifold matrix and the ToF spectrum data comprises:

determining, according to the corrected coarse spatial manifold matrix and the ToF spectrum data, a ToF of each path of the positioning signal, a reference AoA of each path of the positioning signal, and an attenuation coefficient of each path of the positioning signal;

determining an LOS from all paths according to the attenuation coefficient of each path and the ToF of each path;

dividing according to a reference AoA corresponding to the LOS, so as to obtain a second preset corresponding angle range; and determining the fine ideal spatial manifold matrix according to the second preset corresponding angle range.

6. The method as claimed in claim 5, wherein determining the ToF corresponding to the LOS according to the corrected coarse spatial manifold matrix and the ToF spectrum data comprises:

determining the ToF corresponding to the LOS according to the ToF of each path and the attenuation coefficient of each path.

7. The method as claimed in claim 5, wherein determining, according to the corrected coarse spatial manifold matrix and the ToF spectrum data, the ToF of each path of the positioning signal, the reference AoA of each path of the positioning signal, and the attenuation coefficient of each path of the positioning signal comprises:

determining two-dimensional positioning parameter spectrum data according to the corrected coarse spatial manifold matrix and the ToF spectrum data; and performing spectrum peak extraction according to the two-dimensional positioning parameter spectrum data, so as to obtain the ToF of each path of the positioning signal, the reference AoA of each path of the positioning signal, and the attenuation coefficient of each path of the positioning signal.

8. The method as claimed in claim 1, wherein determining the ToF spectrum data of the positioning signal according to the positioning signal sent via multi-channels by the terminal to be positioned comprises:

performing Fourier transform on the positioning signal sent via multi-channels by the terminal to be positioned, so as to obtain multi-channel frequency-domain signals;

performing channel estimation on the multi-channel frequency-domain signals, so as to obtain a Channel Frequency Response (CFR) matrix; and acquiring the ToF spectrum data based on the CFR matrix.

9. The method as claimed in claim 8, wherein acquiring the ToF spectrum data based on the CFR matrix comprises:

acquiring a channel calibration coefficient, and correcting the CFR matrix according to the channel calibration coefficient, so as to obtain a corrected CFR matrix; and acquiring the ToF spectrum data according to the corrected CFR matrix.

10. The method as claimed in claim 9, wherein performing channel estimation on the multi-channel frequency-domain signal comprises:

acquiring a positioning sequence of each sub-band occupied by the positioning signal;

constructing a positioning sequence matrix by using the positioning sequence of each sub-band; and using each element in the positioning sequence matrix as a main diagonal element, so as to obtain a diagonal matrix for channel estimation; and acquiring the channel calibration coefficient comprises: measuring a channel amplitude-phase response matrix as the channel calibration coefficient.

11. A computer device, comprising a memory and a processor, wherein the memory stores a computer program; and the processor, when executing the computer program, implements following actions:

determining Time of Flight (ToF) spectrum data of a positioning signal according to the positioning signal sent via multi-channels by a terminal to be positioned;

correcting an ideal spatial manifold matrix according to a preset antenna array deviation function, so as to obtain a corrected spatial manifold matrix, wherein each element in the ideal spatial manifold matrix or the corrected spatial manifold matrix represents a response of each array element in an antenna array to the positioning signal in a preset corresponding angle range, and the preset antenna array deviation function represents a deviation between a response of a real antenna array to a signal and a response of an ideal antenna array to the signal; and determining a positioning parameter of a Line Of Sight (LOS) of the positioning signal according to the ToF spectrum data and the corrected spatial manifold matrix, wherein the LOS is a shortest path from the terminal to be positioned to the antenna array.

12. The computer device as claimed in claim 11, wherein a process of constructing the preset antenna array deviation function comprises:

acquiring an amplitude measurement value set of direction-dependent amplitude responses and a phase measurement value set of phase deviations, wherein the amplitude measurement value set of direction-dependent amplitude responses is a set of direction-dependent amplitude responses that a simulated real signal arrives at each array element of the antenna array, and the phase measurement value set of phase deviations is a set of phase deviations that the simulated real signal arrives at each array element of the antenna array;

constructing an amplitude pattern function according to the amplitude measurement value set, and constructing a phase deviation function according to the phase measurement value set; and determining the preset antenna array deviation function according to the amplitude pattern function and the phase deviation function.

13. The computer device as claimed in claim 11, wherein the ideal spatial manifold matrix comprises a coarse ideal spatial manifold matrix and a fine ideal spatial manifold matrix; each element in the coarse ideal spatial manifold matrix represents a response of each array element in the antenna array to the positioning signal in a first preset corresponding angle range; each element in the fine ideal spatial manifold matrix represents a response of each array element in the antenna array to the positioning signal in a second preset corresponding angle range; the first preset corresponding angle range is greater than the second preset corresponding angle range.

14. The computer device as claimed in claim 13, wherein the positioning parameter comprises an Angle of Arrival (AA) and a ToF; and determining the positioning parameter of the LOS of the positioning signal according to the ToF spectrum data and the corrected spatial manifold matrix comprises:

correcting the coarse ideal spatial manifold matrix according to the preset antenna array deviation function, so as to obtain a corrected coarse spatial manifold matrix;

determining the fine ideal spatial manifold matrix and the ToF corresponding to the LOS according to the corrected coarse spatial manifold matrix and the ToF spectrum data;

correcting the fine ideal spatial manifold matrix according to the preset antenna array deviation function, so as to obtain a corrected fine spatial manifold matrix; and determining by a preset angle function, the AoA of the LOS according to the corrected fine spatial manifold matrix and the ToF corresponding to the LOS.

15. The computer device as claimed in claim 14, wherein determining the fine ideal spatial manifold matrix according to the corrected coarse spatial manifold matrix and the ToF spectrum data comprises:

determining, according to the corrected coarse spatial manifold matrix and the ToF spectrum data, a ToF of each path of the positioning signal, a reference AoA of each path of the positioning signal, and an attenuation coefficient of each path of the positioning signal;

determining an LOS from all paths according to the attenuation coefficient of each path and the ToF of each path;

dividing according to a reference AoA corresponding to the LOS, so as to obtain a second preset corresponding angle range; and determining the fine ideal spatial manifold matrix according to the second preset corresponding angle range.

16. The computer device as claimed in claim 15, wherein determining the ToF corresponding to the LOS according to the corrected coarse spatial manifold matrix and the ToF spectrum data comprises:

determining the ToF corresponding to the LOS according to the ToF of each path and the attenuation coefficient of each path.

17. The computer device as claimed in claim 15, wherein determining, according to the corrected coarse spatial manifold matrix and the ToF spectrum data, the ToF of each path of the positioning signal, the reference AoA of each path of the positioning signal, and the attenuation coefficient of each path of the positioning signal comprises:

determining two-dimensional positioning parameter spectrum data according to the corrected coarse spatial manifold matrix and the ToF spectrum data; and performing spectrum peak extraction according to the two-dimensional positioning parameter spectrum data, so as to obtain the ToF of each path of the positioning signal, the reference AoA of each path of the positioning signal, and the attenuation coefficient of each path of the positioning signal.

18. The computer device as claimed in claim 11, wherein determining the ToF spectrum data of the positioning signal according to the positioning signal sent via multi-channels by the terminal to be positioned comprises:

performing Fourier transform on the positioning signal sent via multi-channels by the terminal to be positioned, so as to obtain a multi-channel frequency-domain signal;

performing channel estimation on the multi-channel frequency-domain signal, so as to obtain a Channel Frequency Response (CFR) matrix; and acquiring the ToF spectrum data based on the CFR matrix.

19. The computer device as claimed in claim 18, wherein acquiring the ToF spectrum data based on the CFR matrix comprises:

acquiring a channel calibration coefficient, and correcting the CFR matrix according to the channel calibration coefficient, so as to obtain a corrected CFR matrix; and acquiring the ToF spectrum data according to the corrected CFR matrix.

20. A non-transitory computer-readable storage medium, having a computer program stored thereon, wherein following actions are implemented when the computer program is executed by a processor:

determining Time of Flight (ToF) spectrum data of a positioning signal according to the positioning signal sent via multi-channels by a terminal to be positioned;

correcting an ideal spatial manifold matrix according to a preset antenna array deviation function, so as to obtain a corrected spatial manifold matrix, wherein each element in the ideal spatial manifold matrix or the corrected spatial manifold matrix represents a response of each array element in an antenna array to the positioning signal in a preset corresponding angle range, and the preset antenna array deviation function represents a deviation between a response of a real antenna array to a signal and a response of an ideal antenna array to the signal; and determining a positioning parameter of a Line Of Sight (LOS) of the positioning signal according to the ToF spectrum data and the corrected spatial manifold matrix, wherein the LOS is a shortest path from the terminal to be positioned to the antenna array.

* * * * *